(12) United States Patent
Breinlinger et al.

(10) Patent No.: US 12,644,839 B2
(45) Date of Patent: Jun. 2, 2026

(54) METHODS AND SYSTEMS FOR CELL IMAGING

(71) Applicant: Bifrost Biosystems, Inc., Lexington, MA (US)

(72) Inventors: Keith Breinlinger, San Rafael, CA (US); Jonas Jarvius, Uppsala (SE)

(73) Assignee: Bifrost Biosystems, Inc., Lexington, MA (US)

( * ) Notice: Subject to any disclaimer, the term of this patent is extended or adjusted under 35 U.S.C. 154(b) by 69 days.

(21) Appl. No.: 19/212,404

(22) Filed: May 19, 2025

(65) Prior Publication Data

US 2025/0283824 A1 Sep. 11, 2025

Related U.S. Application Data

(63) Continuation of application No. PCT/US2025/012780, filed on Jan. 23, 2025.

(60) Provisional application No. 63/718,528, filed on Nov. 8, 2024, provisional application No. 63/624,430, filed on Jan. 24, 2024.

(51) Int. Cl.
G01N 21/64 (2006.01)

(52) U.S. Cl.
CPC ... G01N 21/6458 (2013.01); G01N 2201/062 (2013.01); G01N 2201/0635 (2013.01)

(58) Field of Classification Search
None
See application file for complete search history.

(56) References Cited

U.S. PATENT DOCUMENTS

| | | | |
|---|---|---|---|
| 2009/0174876 A1* | 7/2009 | Schriever | G03F 7/70825 355/69 |
| 2016/0109811 A1* | 4/2016 | Menon | G03F 7/70425 355/67 |
| 2020/0142171 A1* | 5/2020 | Xiong | G02B 21/06 |
| 2020/0192071 A1 | 6/2020 | Newman et al. | |
| 2023/0206489 A1 | 6/2023 | Stopka et al. | |
| 2025/0147398 A1* | 5/2025 | Akiyama | G03B 21/204 |

FOREIGN PATENT DOCUMENTS

| | | | | |
|---|---|---|---|---|
| CN | 110967817 A | * | 4/2020 | ........ G02B 21/0032 |
| JP | 2002350973 A | * | 12/2002 | |

OTHER PUBLICATIONS

Rogers, Edward TF, et al. "A super-oscillatory lens optical microscope for subwavelength imaging." Nature materials 11.5 (2012):432-435. (Year: 2012).*

Murade, C. U., D. Van Der Ende, and F. Mugele. "High speed adaptive liquid microlens array." Optics express 20.16 (2012): 18180-18187. (Year: 2012).*

PCT/US2025/012780 International Search Report and Written Opinion dated Apr. 25, 2025.

PCT/US2025/012780 Invitation to Pay Additional Fees dated Mar. 5, 2025.

* cited by examiner

*Primary Examiner* — Dominic J Bologna
(74) *Attorney, Agent, or Firm* — WILSON SONSINI GOODRICH & ROSATI

(57) ABSTRACT

The present disclosure relates to imaging systems and methods of use thereof for imaging with simplified structured illumination microscopy (SIM). The present methods may be simpler and less costly to build and maintain that existing SIM systems. The imaging methods may include oscillating a portion of the imaging system to scan an illumination pattern across a field of view of the sample.

20 Claims, 30 Drawing Sheets iSIM – linear version
simplified without relay lenses and tube lenses iSIM galvo-version
simplified without relay lenses and tube lenses iSIM – linear version
simplified without relay lenses and tube lenses iSIM – rotary version
simplified without relay lenses and tube lenses

Sinusoidal pattern

Triangular pattern

Modified Triangular pattern iSIM – linear version with alternative imaging simplified without relay lenses and tube lenses iSIM – linear version with hyperspectral
simplified without relay lenses and tube lenses iSIM – linear version with multiple illumination sources simplified without relay lenses and tube lenses iSIM – linear version with multiple imaging device simplified without relay lenses and tube lenses iSIM – orbital version
simplified without relay lenses and tube lenses Stagger patterns (shown 1D)

1 Frame per pixel
e.g. – 1000 Frames per second

*First 6 frames shown*

Coverage

1601

Each line corresponds to a single snapshot of the camera = 6 snapshots

1604

1603

Stagger patterns (shown 1D)

1601

1 Frame per 4 pixels
e.g. - 256 Frames per second

First 6 frames shown

1605

1603
Direction of motion

1602
FOV

1901

1902

1903

2001

2002

2003

Multi-color moving SIM moving SIM 2 moving SIM 3 iSIM – Single disk -
simplified without relay lenses and tube lenses 2630                    2640

METHODS AND SYSTEMS FOR CELL IMAGING

CROSS-REFERENCE

This application is a continuation of International Patent Application No. PCT/US2025/012780, filed Jan. 23, 2025, which claims the benefit of U.S. Provisional Application No. 63/624,430, filed Jan. 24, 2024 and U.S. Provisional Application No. 63/718,528, filed Nov. 8, 2024 which applications are incorporated herein by reference.

FEDERALLY FUNDED

This invention was made with Government support under Agreement No. 1AY2AX000005-01, awarded by ARPA-H. The Government has certain rights in the invention.

BACKGROUND

Many applications involving cell imaging require high resolution images. Many of these same applications also want to image a large quantity of cells. For a group of objectives (e.g.—4×, 10×, 20×, 40×, 60× and 100×) they generally tradeoff resolution for imaging area. For example, a 10× objective might have an imaging area that is four times larger than a 20× objective, but the resolution that can be achieved by the 20× may be 1.5 times better in both X and Y dimensions. This tradeoff of resolution and area (or effectively speed) is common to nearly all forms of microscopy. It is very difficult to achieve both high resolution and high speed with a traditional optical system. There exists a need for methods and systems that can produce high throughput of cell images with high resolution for analysis of cell populations. One existing techniques to achieve high resolution and speed is to use multiple imaging systems (e.g.—4 separate cameras, 4 objectives and 4 imaging paths all trained on the same sample can achieve 4× higher throughput than a single imaging system with a downside being roughly four times the cost of a single imaging system, and of course the physical size and complexity of such a system). A second method to achieve both high resolution and high speed is to use large objectives, large image sensors and large optical elements. For example, if an objective has a field number of 18 and a 20× magnification, the Field of View (FOV) would be 18/20=0.9 mm. If the field number was 25, and the magnification 20, the FOV would be 25/20=1.25 mm. Bigger FOVs mean faster imaging but only if the camera, optics and light sources are also matched to accommodate the larger FOV. Some specialty large objectives have been produced with even larger field numbers (>30) but they require very expensive optics, cameras and light source. Hence, there is a need for a low-cost imaging system that can achieve high throughput and high resolution.

SUMMARY

The present disclosure provides methods and systems that meet the need for high throughput imaging at resolutions that enable single cell analytics and subcellular component discrimination and characterization. In particular, the methods and systems described herein are lower cost that multiple imaging systems techniques, very large objectives and other alternatives. In some cases, the imaging systems and methods described herein may simplify some imaging elements to further reduce the total cost of such systems and methods. In some cases, the imaging system may achieve resolution beyond what is capable with existing standard objectives, or super-resolution.

Structure Illumination Microscopy (SIM) is a proven super-resolution microscopy technique that allows a doubling of the resolution of images taken with a microscope objective. SIM allows super resolution by digitally combining many pictures to reconstruct a composite image with improved resolution. Broad use of SIM is limited due to the very slow imaging speed and implementation complexity. Instant SIM (iSIM) is an alternative technique that achieves the same super-resolution as SIM, but significantly faster—up to 10,000 times faster. However, existing iSIM systems are based on a double-sided galvanometric mirror to scan the excitation and emission light beams across the sample and the imaging device. The complexity of multiple optical elements in existing galvanometric based iSIM imaging systems results in systems that are prone to misalignment and drift due to small shifts in any of many key optical elements. In contrast to the complexity and high cost of galvanometric based iSIM imaging systems, disclosed herein is movement based iSIM imaging systems and methods that are significantly more compact, less complex, easier to integrate with additional imaging modalities and require lower capital costs. In imaging systems, each additional component will reduce transmission, reduce resolution, increase aberrations, as well as complicate assembly, serviceability and maintenance processes. For these reasons, the compact and simpler systems and methods described herein prove advantageous over previous iSIM systems.

The key feature of the systems and methods described herein relate to movement of one or more of the sample, the imaging device, and the optical mask(s)—which may comprise a beamlet forming element and/or a pinhole array. Many different embodiments of such imaging systems based around movement of an illumination pattern across a sample field of view are described herein and may be generally categorized by the key elements that move. For example, some optical systems move a stage comprising the optical masks on the emission and/or excitation pathways. Other optical systems comprise the optical masks on rotating discs in the emission and/or excitation pathways. Lastly, some imaging systems described herein move the sample and/or imaging device with respect to stationary optical masks and illumination sources.

In one aspect, the present disclosure provides a method of imaging a sample comprising: (a) directing an illumination beam from an illumination source to the sample, wherein the illumination beam passes through a first beamlet forming element; (b) receiving an optical signal from the sample, (c) directing at least a portion of the optical signal through a second beamlet forming element to one or more collection units; and (d) during the imaging, oscillating (i) the first beamlet forming element, and (ii) the second beamlet forming element.

In some cases, the first beamlet forming element and the second beamlet forming element oscillate together as a single oscillation unit. In some cases, the method further comprises, after (d), translocating the first beamlet forming element and the second beamlet forming element out of an optical path and imaging in a second modality.

In some cases, the single oscillation unit oscillates with respect to the one or more collection units. In some cases, the optical signal passes through a mask array which is oscillated with the second beamlet forming element. In some cases, the illumination beam passes through a mask array which is oscillated with the first beamlet forming element. In some cases, the first beamlet forming element forms a pattern on the sample which at least one dimension is close to or at the diffraction limit. In some cases, the excitation beam is comprised of more than one wavelength. In some cases, the single oscillation unit oscillates at a frequency from about 1 Hz to about 100 Hz. In some cases, the single oscillation unit oscillates with respect to the illumination source, a collection unit of the one or more collection units, and the sample. In some cases, oscillating the single oscillation unit comprises linear oscillation. In some cases, the linear oscillation is in a sinusoidal pattern. In some cases, the linear oscillation is in a modified triangular pattern. In some cases, the illumination source comprises at least one laser. In some cases, the illumination source comprises at least one LED. In some cases, the single oscillation unit comprises a counterbalance oscillating opposite to the first beamlet forming element and the second beamlet forming element. In some cases, the light dispersion element is located the optical path between the emission beamlet forming element and a collection unit of the one or more collection units.

In another aspect, the present disclosure provides a method of imaging a sample, comprising: (a) directing an illumination beam from an illumination source to the sample, wherein the illumination beam passes through a first beamlet forming element; (b) collecting an optical signal from the sample, wherein the optical signal, passes through a second beamlet forming element to one or more collection units; and (c) rotationally translating the first beamlet forming element and the second beamlet forming element around a common rotational axis. In some cases, the optical signal from the sample does not pass through the first beamlet forming element. In some cases, the first beamlet forming element is located on a first disc and the second beamlet forming element is located on a second disc. In some cases, the first disc further comprises a first mask array. In some cases, the second disc further comprises a second mask array. In some cases, the illumination beam is parallel and offset from the common rotational axis.

Another aspect of the present disclosure provides an imaging system comprising: an illumination source configured to provide an illumination beam; an excitation beamlet forming element configured to direct the illumination beam to a sample; an emission beamlet forming element configured to focus an optical signal from the sample to one or more collection units; and an oscillation unit configured to oscillate the excitation beamlet forming element and the emission beamlet forming element. In some cases, the oscillation unit is configured for linear motion. In some cases, the oscillation unit is configured for rotational motion. In some cases, the oscillation unit is configured to translate the excitation beamlet forming element and the emission beamlet forming element out of the optical path to allow another imaging modality. In some cases, the imaging system further comprises a light dispersion element in the optical path between the emission beamlet forming element and a collection unit of the one or more collection units. In some cases, the first beamlet forming element is configured to focus the illumination beam into a plurality of illumination beamlets. In some cases, the imaging system further comprises an optical mask configured to create an illumination pattern on the sample. In some cases, the imaging system further comprises an optical mask configured to match the second beamlet forming element and move with the second beamlet forming element. In some cases, at least one segment of the illumination pattern is diffraction limited in at least one dimension.

Another aspect of the present disclosure provides an imaging system comprising: an illumination source configured to provide an illumination beam; an excitation beamlet forming element configured to direct the illumination beam to a sample; and an emission beamlet forming element configured to focus an optical signal from the sample to one or more collection units, wherein the excitation beamlet forming element is located on a first disc and the emission beamlet forming element is location on a second disc, and wherein the first disc and the second disc are configured to rotationally translate the excitation beamlet forming element and the emission beamlet forming element around a common rotational axis. In some cases, both the first disc and the second disc rotate at the same speed and are configured such that each lenslet of the excitation beamlet forming element on the first disc corresponds to a matching lenslet of the emission beamlet forming element on the second disc. In some cases, the first disc and the second disc are mechanically coupled to rotationally oscillate in sync with each other. In some cases, the system further comprises at least two turn mirrors configured to direct the illumination beam and/or an optical signal from the sample around the common rotational axis. In some cases, the first disc and the second disc are mechanically coupled via a shaft located on the common rotational axis. In some cases, a collection unit of the one or more collection units is an electronic camera. In some cases, the excitation beamlet forming element is configured to focus the illumination beam into a plurality of illumination beamlets. In some cases, the system further comprises an optical mask configured to create an illumination pattern on the sample. In some cases, at least one segment of the illumination pattern has a dimension at or near the diffraction limit.

Another aspect of the present disclosure provides a method of imaging a sample through structured illumination microscopy (SIM), comprising: (a) directing an illumination beam through a first optical element to create an illumination pattern on the sample, wherein the illumination pattern has at least one dimension at or near the diffraction limit, wherein the illumination pattern moves with respect to the sample; and (b) collecting, via a collection unit, an emission signal from the sample. In some cases, the illumination pattern illuminates less than half of the sample. In some cases, the illumination pattern comprises a plurality of diffraction limited or near diffraction limited patterns. In some cases, the illumination pattern comprises a plurality of spots in an array. In some cases, the illumination pattern comprises a plurality of lines which are not parallel to the direction of motion of the illumination pattern. In some cases, the illumination pattern is formed at least in part by passing the illumination beam through an optical mask. In some cases, the illumination pattern is formed at least in part by passing through the illumination beam through a beamlet forming element and the beamlet forming element splits the illumination beam into a plurality of illumination beamlets. In some cases, the illumination pattern moves in a linear motion. In some cases, the illumination pattern moves in a non-linear motion. In some cases, the movement of the illumination pattern with respect to the sample is a short, non-linear repeating pattern. In some cases, the non-linear motion is a circular motion.

Another aspect of the present disclosure provides an imaging system comprising: an illumination source configured to provide an illumination beam; an excitation beamlet forming element configured to direct the illumination beam to a sample; a motion stage configured to move the sample relative to the illumination beam; and a collection unit configured to receive an optical signal from the sample. In some cases, the illumination beam comprises at least one line not parallel to a motion of the sample relative to the illumination beam. In some cases, the illumination beam comprises a plurality of lines at different angles and each line of the plurality of lines is not parallel to the motion. In some cases, each line of the plurality of lines has a width which is diffraction limited or near diffraction limited. In some cases, the illumination beam comprises a pattern of diffraction limited or near-diffraction limited spots. In some cases, the illumination beam comprises more than one wavelength.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

In an aspect, the present disclosure provides an imaging system. The present disclosure also provides at least one method of imaging. The one or more methods provided herein may use one or more embodiments of the imaging systems described herein. The imaging system may be a confocal imaging system. The confocal imaging system may use lenses to focus a beam or a plurality of beams of light through a pinhole or mask. The confocal imaging system may direct an illumination beam (or excitation beam) through a pinhole or mask. Alternatively, or in addition, the confocal imaging system may direct an emission beam, collected by the system, through a pinhole or mask. Confocal imaging systems allow a small point of a sample to be illumination (e.g., contacted with an illumination or excitation beam or beams). Passing the collected signal back through a pinhole or mask rejects signals from adjacent and/or out-of-focus points on the sample. A benefit of confocal imaging (e.g., confocal microscopy) is that it enables high contrast of samples by virtue of rejecting out of focus light from the sample.

In some embodiments, an imaging system described herein, or used by a method described herein, comprises structured illumination microscopy (SIM). SIM generally refers to the method of imaging a full field of view by imaging smaller section or portions of the field of view and computing the total field of view by processing signals received for each of the smaller sections or portions. If the field of view is sparsely illuminated and the illumination signal or signals are at or near the diffraction limit of the objective, the collected optical signal can be processed by a computer algorithm and the resultant image can have a resolution better than the diffraction limit. A benefit of SIM is that it enables higher resolution images, than would be possible with a given objective (a.k.a.—super resolution imaging) by taking multiple partially illuminated images and computationally combining them to form a complete image of the entire field of view at a resolution better than can be achieved with a single image. Several SIM systems take between 9 and 16 discrete images, these images are fed into a computer and an algorithm computes the new super resolution image. A disadvantage to some methods of SIM is the computation needs to reconstruct the full field of view image from the multiple images and the time required. The overall time required when compared to a single image can be ten to more than 100 times longer because the system must take the multiple images and then must perform rather complex reconstruction computations.

Figure 1:
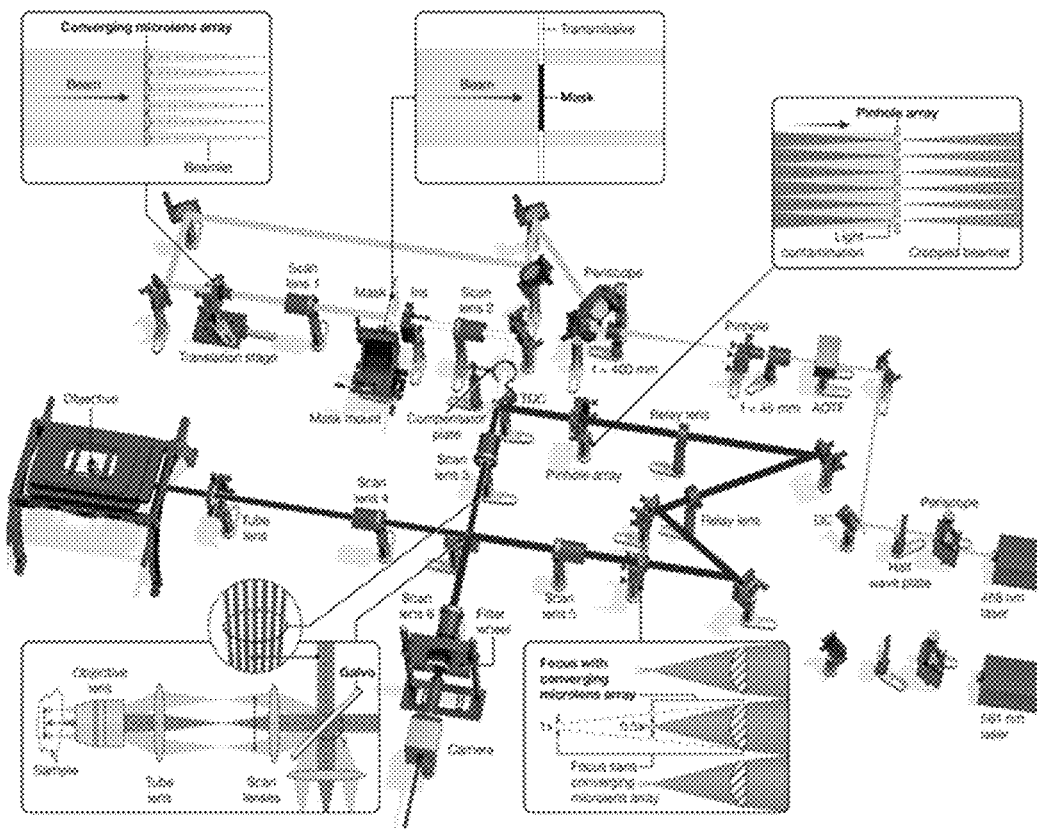
FIG. 1 shows a double-sided galvanometric mirror based iSIM imaging system to contrast with the disclosed invention.

FIG. 1 shows a double-sided galvanometric mirror based iSIM imaging system to contrast with the disclosed invention. The system of FIG. 1 requires that the excitation beam contacts a galvanometric mirror on a first side to scan the illumination beam across the field of view of the sample, and that the emission signals from the sample contact the galvanometric mirror on a first side and a second side of the galvanometric mirror before being directed to the collection unit. This is required to use a galvanometric mirror to scan the illumination points across the sample and collect from those focal points in the emission pathway with a stationary collection unit, where the scanning is produced by the galvanometric mirror. This type of system also requires additional relay lenses and optical elements to direct the emission pathway from the first side of the galvanometric lens to the second side of the galvanometric lens and therefore increases the overall complexity of the systems and requires several alignment steps within the optical path.

As used herein, the term "beamlet forming element" may generally refer to an optical element that is configured to create two or more beamlets from a beam of light. The beam of light may be collimated. The beamlets may be collimated. The beamlet forming element may be or comprise a lenslet array, a hologram, a patterned Fresnel lens, or another optical element capable of producing two or more beamlets from a beam of light. While some non-limiting examples and Figures provided herein may refer to a beamlet forming element as a lenslet array, it should be understood that another type of beamlet forming element, for example a holographic element or patterned Fresnel lens, may be substituted.

Figure 2:
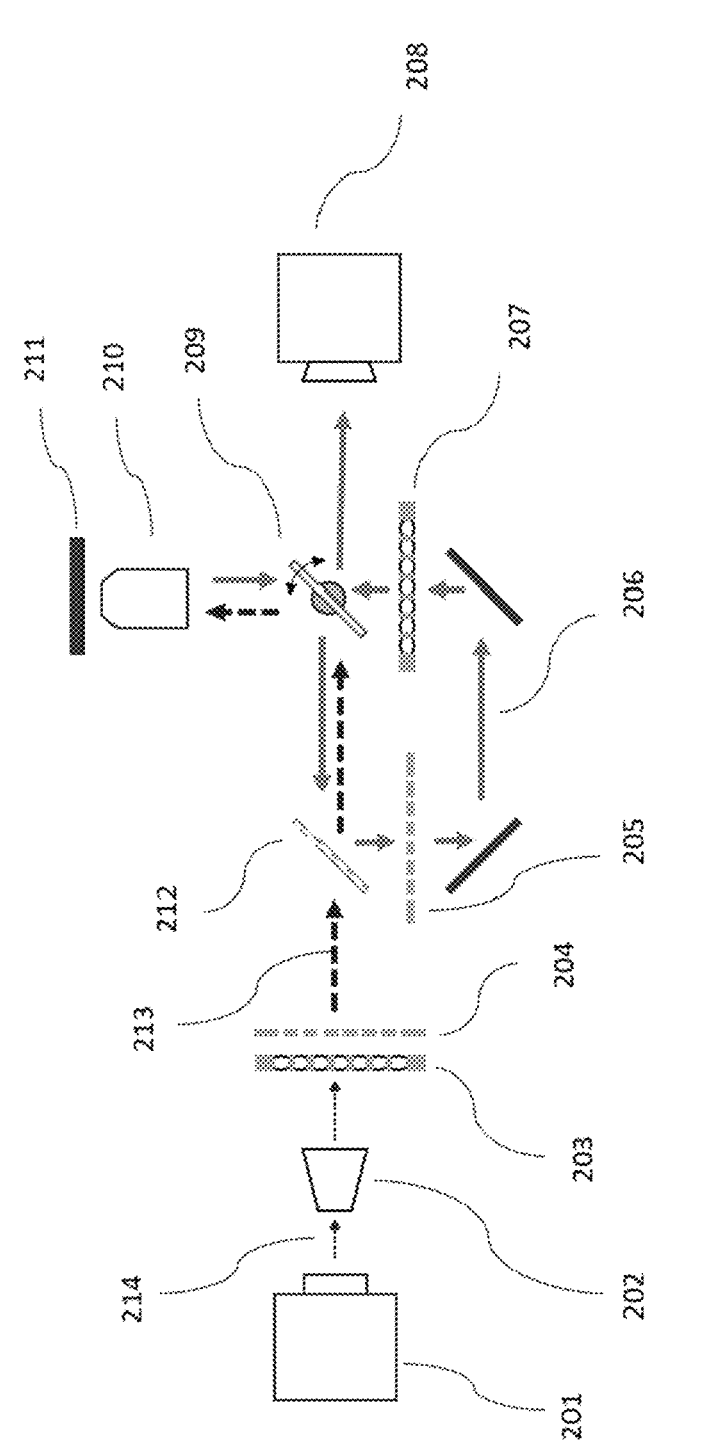
FIG. 2 shows a simplified version of the double-sided galvanometric mirror based iSIM imaging system to contrast with the disclosed invention.

FIG. 2 shows a simplified version of the iSIM imaging system described in FIG. 1. The illumination source 201 directs an excitation beam 214 towards a galvanometric double-sided mirror 209. The excitation beam may pass through an excitation beamlet forming element (e.g., a lenslet array) 203 and an excitation pinhole array 204 to create an excitation beam comprising an array of beamlets 213. The excitation beam may pass through a dichroic mirror 212, reflect off a first side of the galvanometric double-sided mirror 209, pass through an objective 210 and contact the sample 211. The reflected (e.g., emission) signals from the sample pass through the objective 210, off the first side of the galvanometric double-sided mirror, off the dichroic mirror 212 to an emission pinhole array 205. Exiting the emission pinhole array 205 is an emission beam comprising an array of emission beamlets 206. The emission beam passes through an emission beamlet forming element (e.g., a lenslet array) 207 and onto the second side of the double-sided galvanometric mirror 209 and into the image sensor 208. This galvanometric system requires the excitation signal to reflect off the first side of the galvanometric double-sided mirror, and the emission signal to reflect off both the first side and the second side of the galvanometric double-sided mirror. For cell imaging, where many cells and fields of view may need to be imaged at high throughput (for example taking 100 s or 1000 s of images per slide or per well plate), the systems described herein may address or reduce the high computation needs and cycle times of SIM methods.

In contrast to the galvanometric mirror-based imaging systems shown in FIGS. 1 and 2, the imaging system described herein may address or reduce the high computation needs and cycle times of SIM methods while also reducing the complexity of the imaging elements. The imaging systems and methods may comprise a confocal microscopy (or near confocal) and/or structured illumination microscopy. In some embodiments, the imaging system may illuminate a portion of a field of view via masking, lensing or both. The imaging system may scan one or more points, lines, shapes or patterns across a field of view comprising an imaging sample. The term "illumination pattern" as used herein may refer to point, a plurality of points, a regular array of points, a line, a plurality of lines, a shape, a combination of these or another pattern which illuminates only a portion of the entire field of view and in the preferred embodiment has at least one dimension of the pattern at or near the diffraction limit. The pattern may be sparsely illuminated such that the point spread function (or line spread function) of the patterns do not significantly overlap, The imaging sample may aggregate an image of the full field of view by processing the signals collected from the plurality of illumination patterns. Challenges to configuring and operating an imaging system that comprises structured illumination microscopy elements and produces a full field image are addressed by elements of the invention described herein.

Figure 3:
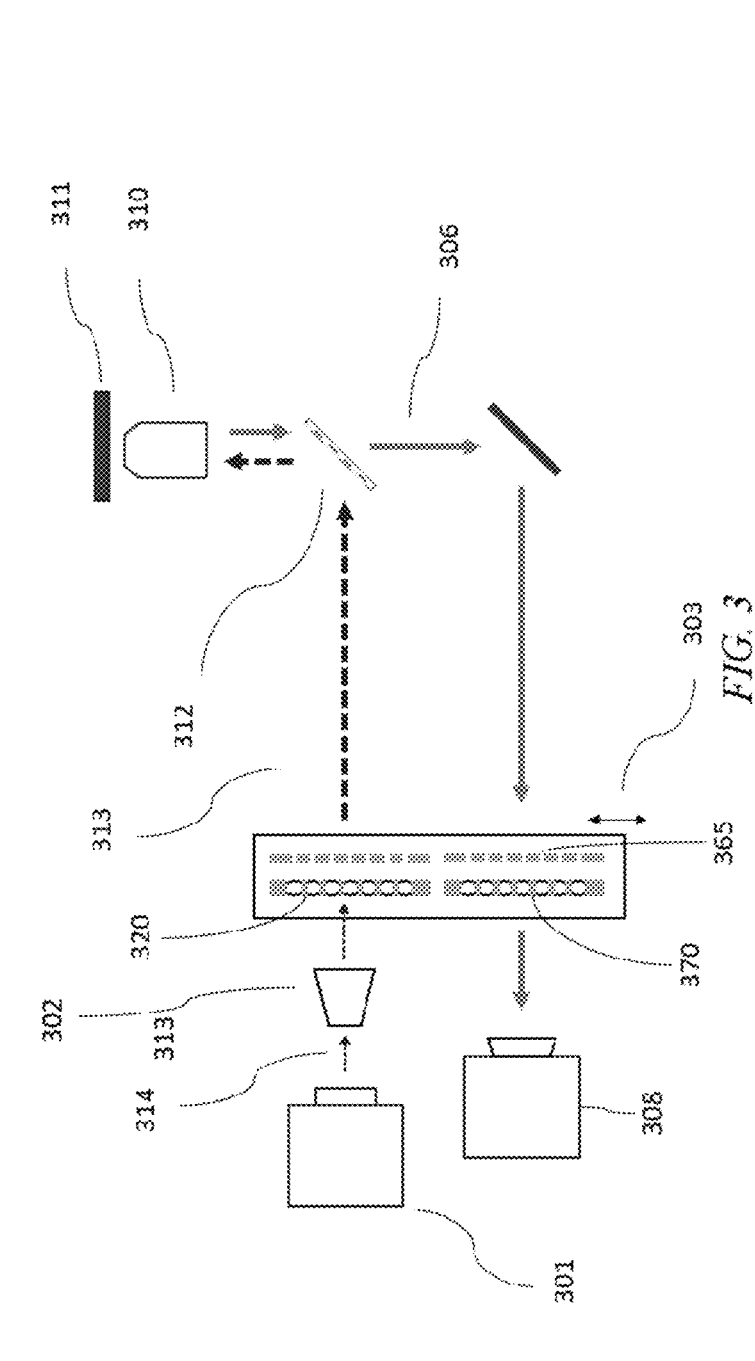
FIG. 3 shows a linear movement based iSIM imaging system in accordance with some embodiments described herein.

FIG. 3 shows an example of a simplified linear iSIM imaging system in accordance with some embodiments described herein. The imaging system may comprise an illumination source 301. The illumination source may direct an excitation (e.g., illumination beam) 314 towards a beamlet forming element and mask. The beamlet forming element may focus the excitation beam into an array of beamlets. The mask may be a physical mask or an electronic mask. The mask may comprise a plurality of pinholes. Together, the mask and the beamlet forming element may allow the imaging system to be confocal or nearly confocal. The excitation beam comprising an array of beamlets 313 may reflect off a dichroic mirror 312 towards a sample 311. (Alternatively—the excitation beam may pass through a dichroic mirror and the emission beam may be reflected—not shown.) The excitation beam may pass through an objective 310. The system may comprise a collection unit 308. The collection unit may be or comprise a camera. The collection unit may be or comprise an image sensor. The system may comprise a sample 311. Alternatively, the system may be used to image a sample 311. The sample may comprise a cell or a plurality of cells. The term "sample" as used herein may refer to an object, material, specimen, sample or tissue, including but not limited to in vivo or ex vivo tissue, a single cell, a plurality of cells, a culture all of which may be illuminated by the excitation beam (or beams) and emit a signal (e.g.—one or more fluorescent signals) in all or some portions of the sample.

The illumination source 301 may provide an illumination beam directed through a beamlet forming element. The term "excitation light beam," as used herein, generally refers to the focused light beam directed to sample (e.g., one or more cells) to create a generated signal (e.g., an emission beam comprising one or more emission signals). An excitation light beam may be a single beam of light. An excitation light beam may be a pulsed single beam of light. An excitation beam of light may be a plurality of light beams. The plurality of light beams may be synchronized in time and location as described herein. An excitation beam of light may be a pulsed beam or a continuous beam or a combination one or more pulsed and/or continuous beams that are delivered simultaneously to the sample. The excitation light beam may be selected depending upon the predetermined type of return signal or generated signal as described herein. An excitation beam of light as used herein includes an illumination light used to generate a reflected or transmitted signal, e.g., a confocal or structured illumination signal.

The excitation light beam may comprise unpolarized light. In other embodiments, the excitation light beam may comprise polarized light or coherent, monochromatic light (e.g.—laser light). A wavelength of the excitation light beam may be greater than or equal to about 300 nanometers (nm), 350 nm, 405 nm, 488 nm, 500 nm, 550 nm, 600 nm, 650 nm, 700 nm, 750 nm, 800 nm, 850 nm, 900 nm, 950 nm or longer. In some cases, a wavelength of the excitation light beam may be less than or equal to about 950 nanometers (nm), 900 nm, 850 nm, 800 nm, 750 nm, 700 nm, 650 nm, 600 nm, 550 nm, 500 nm, 450 nm, 400 nm or shorter. The wavelength of the excitation light may be between any two values described herein, for example between about 300 nm and 900 nm, between about 350 nm and 850 nm, between about 400 nm and 800 nm, or between about 405 nm and 750 nm.

The illumination source may comprise an LED, laser, or other source of electromagnetic excitation. The illumination source may generate a steady or a pulsed illumination (e.g., excitation beam). The pulse frequency may be configured to sync with the oscillation of the system. For example, the pulse frequency and duration may align with an oscillation waveform of the beamlet forming elements such that the light is on during the constant velocity (or near constant velocity) portion of the waveform and off at the peaks and troughs of the waveform.

It shall be understood that where describing a beam, for example an excitation, illumination, emission or collection beam, the beam may comprise a plurality of beamlets generated or collected by a plurality of lenslets of an array.

The beamlet forming element may comprise one or more lenslets. In some cases, the beamlet forming element may comprise greater than or equal to about 9 lenslets, 16 lenslets, 25 lenslets, 36 lenslets, 100 lenslets, 400 lenslets, 625 lenslets, 1600 lenslets, 2500 lenslets, or 10000 lenslets. In some cases, the beamlet forming element may comprise less than or equal to about 5 lenslets, 10 lenslets, 15 lenslets, 20 lenslets, 30 lenslets, 40 lenslets, 50 lenslets, 60 lenslets, 75 lenslets, 80 lenslets, 100 lenslets, 125 lenslets, 150 lenslets, 175 lenslets, 200 lenslets, 250 lenslets, 300 lenslets, 350 lenslets, 400 lenslets, 500, 1000, 2000, 3000, 4000, 5000, or greater lenslets. In some cases, the beamlet forming element may comprise a number of lenslets between any two numbers described herein, for example between about 400 lenslets and about 1000 lenslets.

The light may be directed from the beamlet forming element to a mask array 330. The mask array may comprise a plurality of openings that correspond to a lenslet of the beamlet forming element. In some embodiments, the mask array 330 can be omitted with minimal impact on the performance and resolution of images. The mask array may comprise a plurality of pinholes. A lenslet of the beamlet forming element may focus a portion of the illumination beam (e.g., a beamlet) through a pinhole of the pinhole array. In some embodiments, the mask array and beamlet forming element may be combined into a single part.

The beamlet forming element 320 and the mask array may be coupled to a platform (e.g., linear stage 303). The platform may be coupled to an oscillator. The oscillator may be a voice coil, linear motor, harmonic oscillator, flexure based oscillator, or other type of oscillator. The platform may comprise a second beamlet forming element 370 and optionally a second mask array 365. The system may direct the illumination beam from the first beamlet forming element to a sample. The illumination beamlets generated by the first beamlet forming element and optional first mask array may be directed to the sample via a mirror. The mirror may be a dichroic mirror 312. Upon the illumination beamlets contacting the sample, one or more signals, generated from the sample (e.g., emission signals) may be directed back to the dichroic mirror 312 and collected by the collection unit. In path to the collection unit, the emission signals (e.g., emission beamlets) may be reflected by (or pass through) a mirror through the second mask array and second beamlet forming element. In some embodiments, the first and second beamlet forming elements may be fabricated as one piece. In other embodiments the beamlet forming elements may be constructed and assembled for 2 or more lenslet groups or made from individual lenses.

The platform comprising the optional first mask array, first beamlet forming element, optional second mask array, and second beamlet forming element may be configured to oscillate (e.g., move along a first axis). The oscillation may be perpendicular to an optical axis of the illumination and/or emission beam. The oscillation of the platform may allow the illumination beamlets to scan across the full field of view of the sample. The oscillation of the platform may allow each individual illumination beamlet to scan only a small portion of the field of view, yet the sum of all beamlets may allow the entire field of view to be illuminated over one cycle of illumination. The emission beamlet forming element may be a square grid of lenslets, tilted a small fraction of a degree off parallel to the direction of oscillation, such that the spot formed by one lenslet just touches the spot formed by another lenslet (e.g.—the spots do not significantly overlap nor do they leave a significant gap when the beamlet forming element is oscillated) The emission beamlets, collected by the collection unit (e.g., one or more cameras) may enable structured illumination microscopy. In contrast to other systems which may require a scanning mirror to scan one or more focal points across the field of view, the present system may move the lenslet and mask arrays. The lenslet and mask arrays may translate in a back and forth motion. The present system may move only the platform comprising the first beamlet forming element, first mask array, second beamlet forming element, and second mask array. Some embodiments may have no mask or pinhole arrays or only one mask or pinhole array. The illumination source may be stationary with respect to the sample. The collection unit may be stationary with respect to the sample. The system may not require a scanning galvanometer. This may allow the system to be less complex, significantly more compact, and/or require lower capital costs. Another benefit of oscillating the lenslet platform instead of scanning with a mirror is that it requires far fewer optical components and thus may reduce a risk of misalignment of an element which causes a distortion or loss of resolution in the optical path between the illumination source, the sample, and the collection unit. It is further less likely to suffer misalignment due to heating or other external physical forces since the optical path is comprised of fewer units and that the units are in close proximity and key moving parts could also be linked to same actuation device. By minimizing the number of optical elements thru which the excitation and especially the emission path must pass, the invention herein achieves better optical performance than an equivalent galvanometer system.

The emission beam received from the sample may comprise one or more signals. The one or more signals may comprise one or more signals from fluorescent probes. In some embodiments, two or more excitation wavelengths may be used simultaneously to excite one or more dyes on the sample. In some embodiments, one excitation wavelength can be used to excite two or more dyes that emit at different wavelengths. The emissions from these one or more dyes may pass thru the beamlet forming elements together and may then be decoupled. The imaging system may decouple multiple emissions wavelengths by use of a dichroic and multiple cameras, by a camera with a filter grating (e.g., RGB), by a prism and/or by other wavelength separation techniques.

An objective lens 310 may be used to focus the beamlets from excitation and collect the light from the emission points. This may be an achromat, and apochromat, a plan apochromat, a fluorite or other microscopy objective. The objective may be an air objective or an immersion objective. In some embodiments, multiple objective lenses or objective beamlet forming elements may be used.

Figure 4:
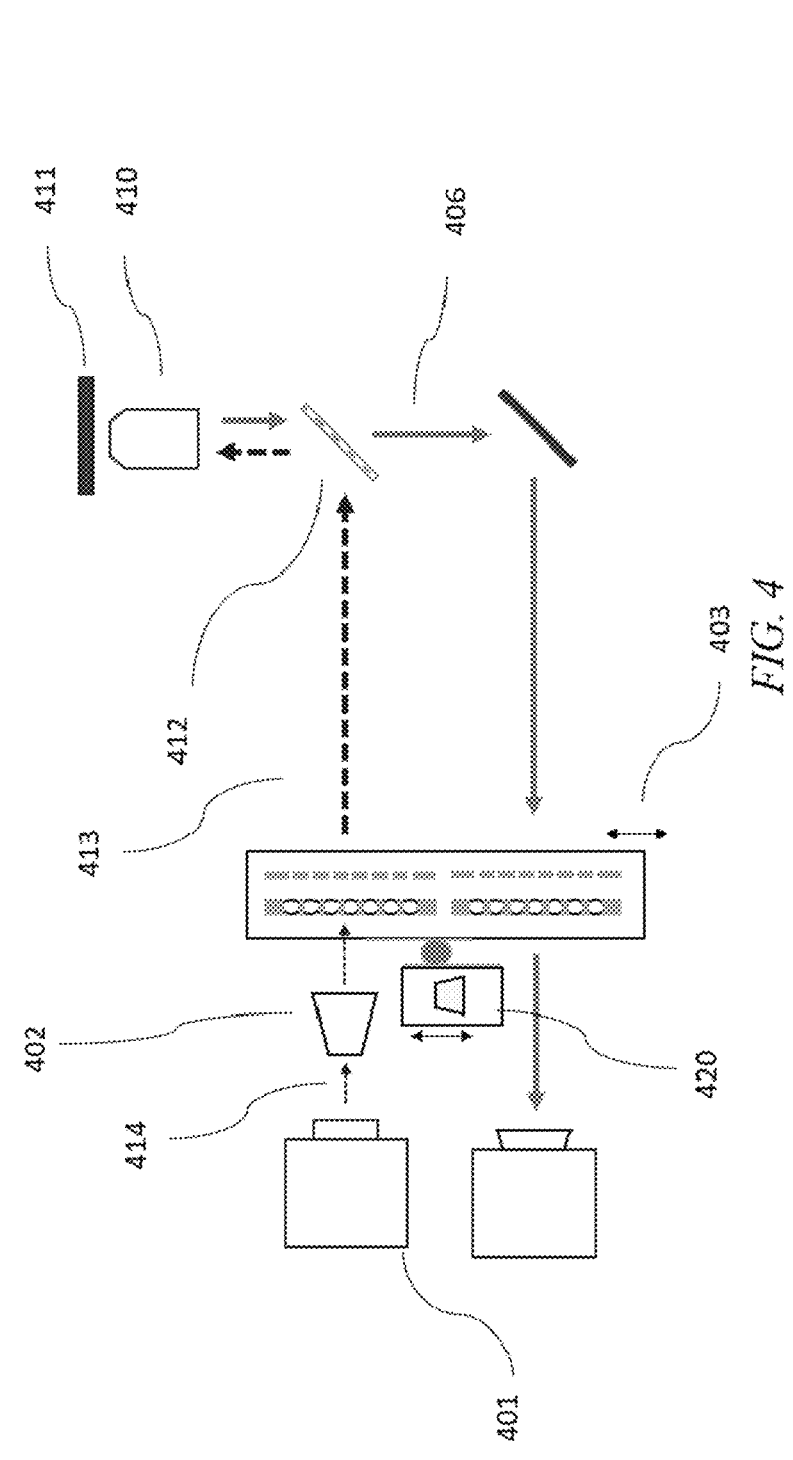
FIG. 4 shows a linear movement based iSIM imaging system with a counterbalance in accordance with some embodiments described herein.

FIG. 4 shows a simplified example of a linear iSIM imaging system with a counterbalance without relay lenses or tube lenses shown. It is understood that in example figures of embodiments described herein some relay lenses or tube lenses are omitted from the figures but may be included in the embodiment described by the figure. In FIG. 4, the counterbalance 420 oscillates on a $2^{nd}$ axis with a counterbalance mass. The counterbalance may be driven by a band drive. The counterbalance may translate in an opposite direction to the moving beamlet forming element. The counterbalance may reduce or eliminate undesirable vibrations. A counterbalance may enable higher scanning speeds compared to a setup without a counterweight.

Figure 5:
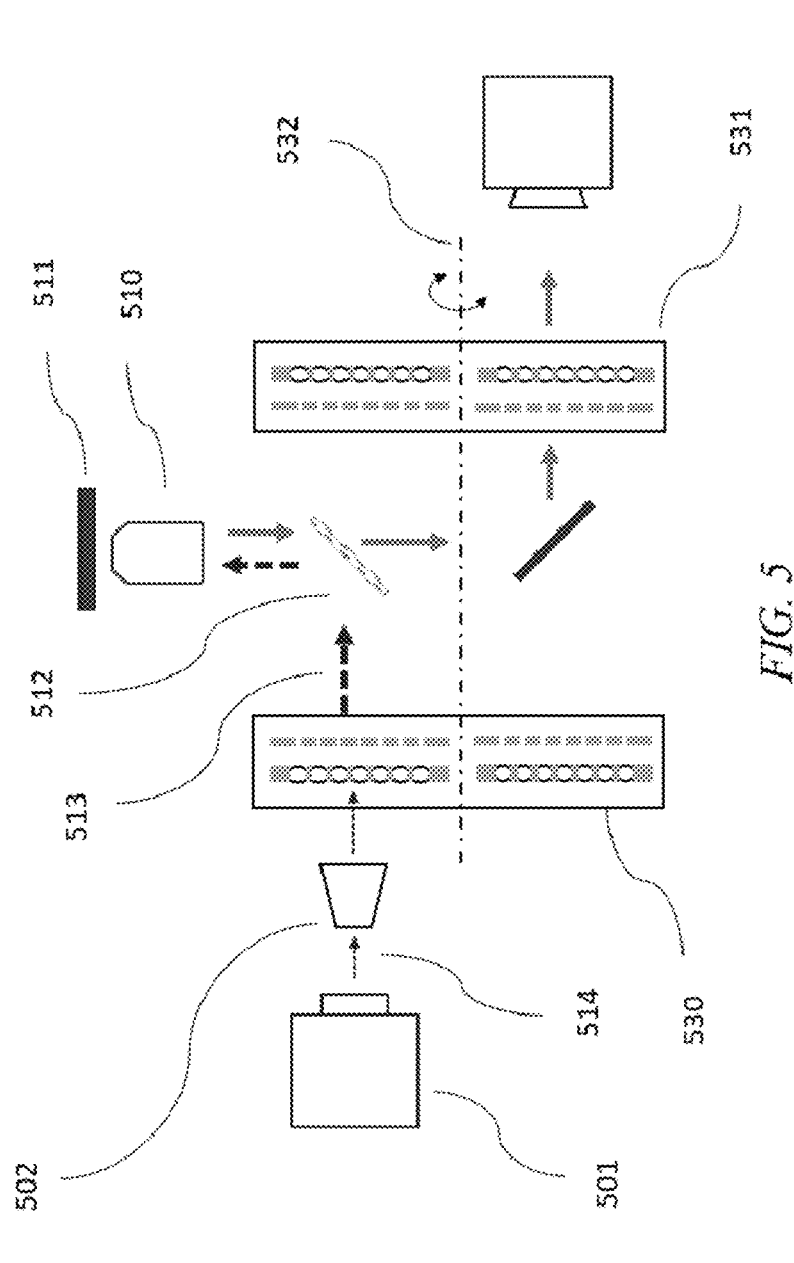
FIG. 5 shows a rotary based iSIM imaging system in accordance with some embodiments described herein.

In addition to the linear iSIM systems of FIGS. 3 and 4, the moving iSIM systems and methods described herein may be achieved with one or more rotary discs. FIG. 5 shows an example of an imaging system in accordance with some embodiments described herein. The imaging system 500 may comprise an illumination source 501. The illumination source 501 may provide an excitation beam 514. The excitation beam may pass through at least one lenslet of a beamlet forming element on an excitation disc 530. This may create illumination beamlets 513 (e.g., portions of the original illumination beam). The illumination beam (e.g., beamlets) may pass through a mask array. The illumination beam may reflect off or pass through a surface of a dichroic mirror 512 and be directed to a sample 511. The system may comprise one or more additional optical elements not pictured. For example, the system may comprise an objective lens 510 located between the dichroic mirror 512 and the sample. The illumination beam may contact a sample 511. Contacting the sample may include contacting a surface of the sample. Contacting the sample may include contacting a portion of the sample below a surface (e.g., a depth into the sample). Upon contact of the illumination beam and the sample, one or more signals may emit from the sample. The system may collect at least a portion of the fluorescent emission from these signals (e.g., emission signals). The emission signals may pass through or be reflected by the dichroic mirror 540. The emission signals may further be directed through a second mask array. The emission beam may be further directed through a second beamlet forming element. The second mask/pinhole array and second beamlet forming element may be located on the emission disc 531. The second beamlet forming element and second mask array may be located separately from the first beamlet forming element and first mask array. The second beamlet forming element may be different from the first beamlet forming element. The first beamlet forming element and first pinhole array may be coupled to a common structure as the second beamlet forming element and the second pinhole array and move and rotate or oscillate together in sync. In some cases, the lenslet and mask array are coupled to a common structure. This may provide the benefit that alignment will be fixed and therefore less subjected to drift over time. Potential distortion effects of heating may be minimized or cancelled out completely. The common structure (e.g., a shaft or platform) may ensure that the first and second beamlet forming elements translate in sync with each other. In FIG. 5, the common structure may be a rotational shaft 532 coupled to a first platform comprising the first beamlet forming element and the first pinhole array at a first segment and coupled to a second platform comprising the second beamlet forming element and second pinhole array at a second segment. The first platform and the second platform may rotate around an axis of the shaft to move the focal points of the illumination and emission beamlets through the field of view of the sample. The illumination beam may be visualized through a collection unit (e.g., an image sensor or camera).

The first pinhole array and/or the second pinhole array may comprise a plurality of defined pinholes. The plurality of pinholes may be equally spaced. The plurality of pinholes may be spaced according to a spacing of one or more lenslets of the beamlet forming element or in a spiral pattern (e.g., an Archimedean spiral pattern).

The dichroic mirror 512 may comprise a dual-wavelength mirror. The dual-wavelength mirror may be used to filter a light beam comprising one or more signals into at least two subsets of the light beam. For example, the dual wavelength mirror may allow a portion of the one or more signals with a first wavelength to substantially pass through the dichroic mirror while a second portion of the one or more signals with a second wavelength is substantially reflected by the dichroic mirror. The dichroic mirror may in fact be a polychroic mirror in which, within a range of wavelengths (e.g.—the visible spectrum), the mirror alternately substantially reflects or substantially transmits a band of wavelengths. For example, a polychroic mirror might transmit from 360 nm to 410 nm, reflect 410 nm to 450 nm, transmit from 450 nm to 500 nm, reflect from 500 nm to 530 nm, transmit from 530 nm to 570 nm and reflect from 570 nm to 620, transmit from 620 nm to 650 nm and reflect from 650 nm to 730 nm—this would be an example of a multi-band dichroic or four band dichroic or a polychroic. As used herein "dichroic" and "dichroic mirror" may also refer to a multi-band dichroic or a polychroic.

The collection unit may comprise an image sensor. In some embodiments, multiple image sensors may be used. In some embodiments there may be two image sensors in which the first sensor receives a portion of the spectral emissions and the second sensor receives the other portion of the spectral emissions. In yet other embodiments, three, four or more image sensors may be used and the spectral components of the emissions can be spread among the image sensors. The image sensor may be a camera, for example a CMOS camera, a sCMOS camera, a CCD camera, a photo-multiplied camera, a line scan camera, a TDI camera or other digital cameras.

Figure 6B:
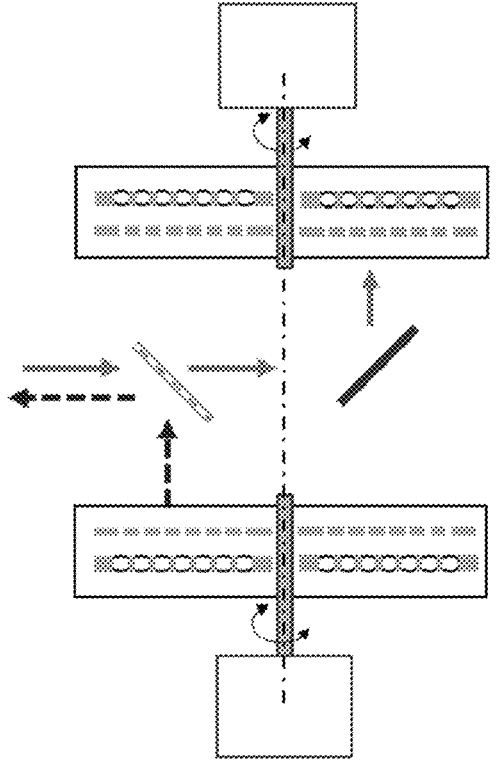
FIG. 6A-D show example of rotary based iSIM imaging systems directing an optical path around structural elements of the rotary system in accordance with some embodiments described herein.
Figure 6A:
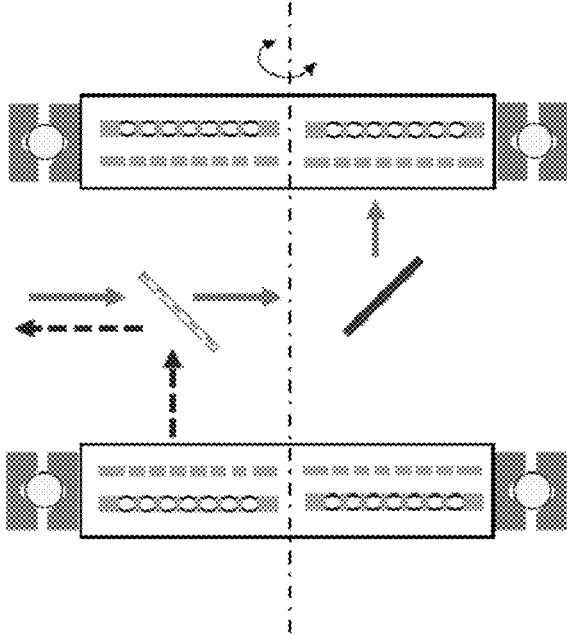
Figure 6C:
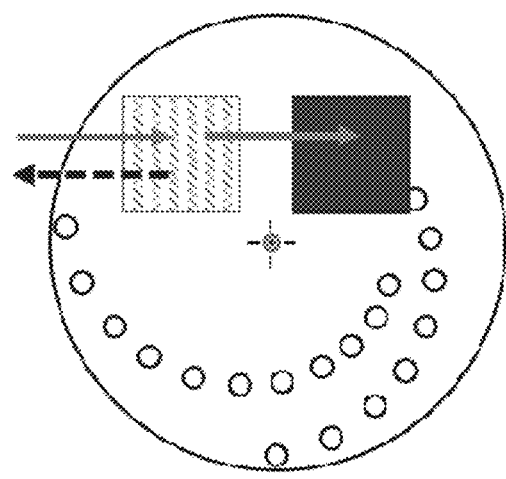
Figure 6C:
Figure 6C:
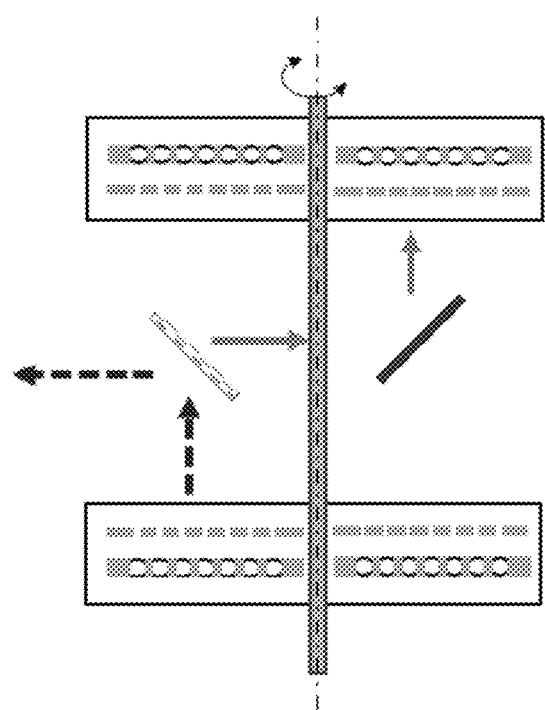
Figure 6D:
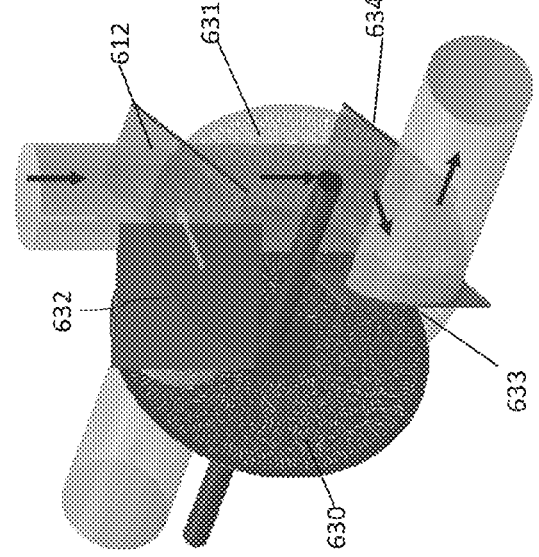
Figure 6D:
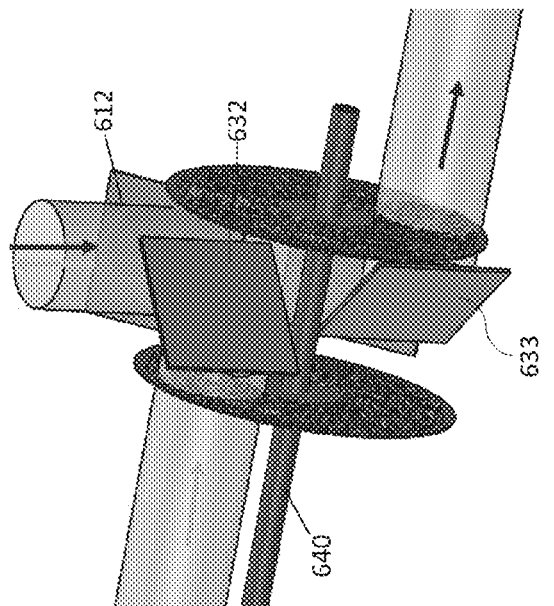

FIGS. 6A-D show examples of a rotary version of an imaging setup in accordance with some embodiments described herein, for example the schematic of the imaging system shown in FIG. 5. A key element of this approach is that the emission side light goes through a beamlet forming element that is distinct from the beamlet forming element used for excitation light. This enables a complete decoupling of the light paths and an optimal path for each. In the system of FIG. 6A, the imaging system comprises an excitation disc and an emission disc. The optical path from the excitation disc to the emission disc reflects off a dichroic mirror, to the objective and sample, back through the dichroic and into the emission disc. To avoid structural elements blocking the optical path between the excitation and emission discs, the embodiment of FIG. 6A comprises bearings 601 and 602 around the outside circumference of the excitation and emission discs. The transmission of rotational energy to each disc is accomplished by a shaft that connects to both discs which is outside the optical path (e.g., band or belt drive, gears, friction drive or other) FIG. 6B shows an alternative solution to removing structural elements that would block the optical path between the excitation disc and the emission disc. FIG. 6B shows two synchronized motors, one coupled to each of the excitation disc and the emission disc. FIG. 6C shows an alternative embodiment where the excitation disc is mechanically coupled to the emission disc by a shaft on the center axis of rotation. The optical path is offset from the central axis or rotation to avoid interference from the mechanical coupling between the excitation disc and the emission disc. FIG. 6D also shows an excitation disc and an emission disc mechanically coupled via a shaft along the central axis of rotation. The shaft 640 does not intersect the optical path. The excitation beam is directed by an excitation turn mirror 632 to the dichroic 612 and up to the objective and sample (not pictured). The emission beam passes through the dichroic 612 to a first emission turn mirror 633 and to a second emission turn mirror 634 before passing through the emission disc 631. This embodiment shifts the optical path around the mechanical shaft with additional turning mirrors.

Figure 7:
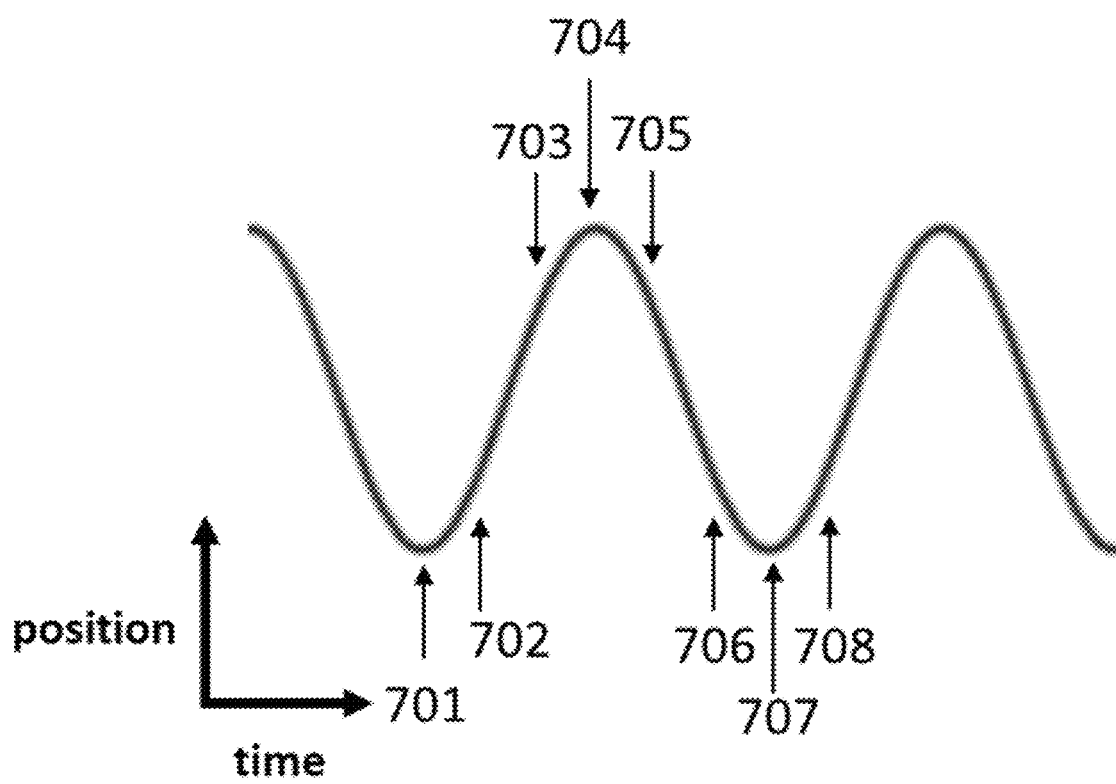
FIG. 7 shows a sinusoidal motion profile for scanning a field of view, in accordance with some embodiments described herein.
Figure 8:
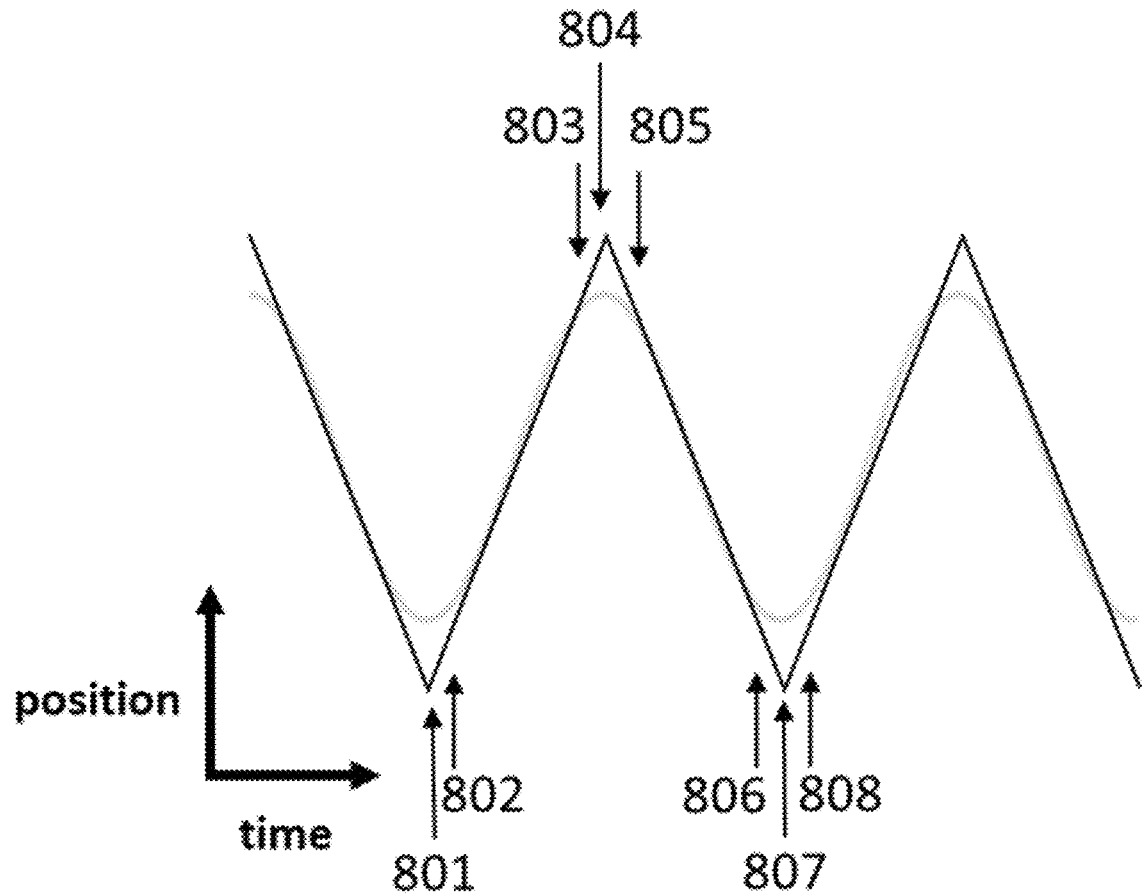
FIG. 8 shows a triangular linear motion profile for scanning a field of view, in accordance with some embodiments described herein.
Figure 9:
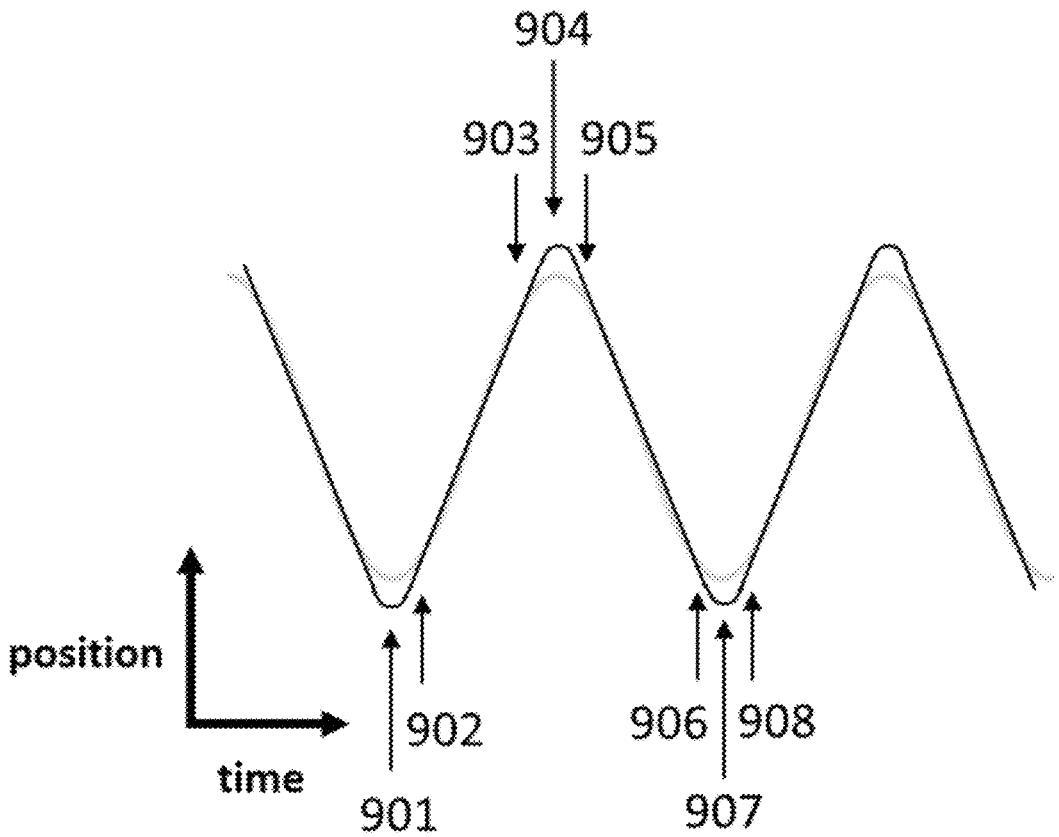
FIG. 9 shows a modified triangular linear motion profile for scanning a field of view, in accordance with some embodiments described herein.

FIGS. 7, 8 and 9 show example waveforms for oscillation of one or more optical units (e.g., the platform comprising the first beamlet forming element, first mask array, second beamlet forming element, and second mask array of the imaging system described herein. For example, the oscillation may have a sinusoidal waveform, or a modified triangular waveform. Example 1 herein discloses multiple methods for timing the illumination source and imaging sensor (e.g., camera) to the linear motion profile. It should be noted that all the oscillation waveforms described herein move the illumination pattern across the field of view in a significantly more uniform way than any constant rotational speed method. This is due to the fact that a constant rotational speed will have lenslets at different radii and thus their arc across the field of view will be at different speeds.

FIG. 8 shows a triangular pattern of a linear motion profile. The triangular pattern may allow the same methods of timing the illumination source and camera as described in Example 1 for sinusoidal pattern. An advantage of a triangular pattern is the constant linear speed of illumination across the field of view. In contrast, a sinusoidal pattern is not completely linear across the field of view. Another advantage of a triangular pattern is that a higher portion of the period may be used to expose the sample. For example, the illumination source and camera may be able to be turned on at 802, which may be closer in time to point 801 than 702 is to 701 in the sinusoidal pattern. 803 may be closer to 804 than 703 is to 704. A challenge with a triangular pattern of linear motion is the high acceleration and jerk at the peaks and troughs of the motion profile (points 801, 804, and 807). This may cause excessive vibration and high forces. Reducing the weight of the oscillating elements may allow for higher acceleration and more triangular pattern scanning.

FIG. 9 shows a modified triangular waveform pattern of a linear motion profile. A modified triangular waveform may provide one or more advantages over a sinusoidal waveform. As discussed above, it is recognized herein that a sinusoidal waveform does not provide a constant speed across the field of view (FOV). A constant speed may provide a constant exposure time and power for each area of the field of view. The oscillation may not be able to achieve a perfectly triangular waveform because the oscillating units of the system have non-zero mass. Therefore, a modified triangular waveform, where the scanning speed across the field of view is constant and the peaks and troughs of the triangular waveform are smoothed out (for example by using constant acceleration or constant jerk) outside of the field of view, may be advantageous. Adding a counterbalance will increase net mass but it may aid in reducing force needed in the critical directional change of the beamlet forming element and may therefore potentially enable the oscillation waveform to be closer to the ideal. The modified triangular waveform may comprise linear scanning across at least the field of view. The illumination source may be pulsed on and off during the modified triangular waveform oscillation. For example, the illumination source may be pulsed on during the linear scanning speed of the modified triangular waveform. The illumination source may be pulsed off during the rounded maximum or minimum amplitude of the waveform. The linear portion of the modified triangular waveform may comprise greater than or equal to about 30%, 40%, 50%, 60%, 70%. 75%, 80%, 85%, 90%, 92%, 95%, 97% or greater of the total amplitude of the wave form. The total oscillation distance may be greater than required to scan the entire field of view of the sample. For example, if the distance between two lenslets of the beamlet forming element is 2 mm, the oscillation may be greater than 2 mm, for example about 2.2 mm. Increasing the distance of oscillation to be greater than a distance between to imaging points may provide the benefit of uniform illumination of the field of view and reduced vibration loads. The exact ratio of the distance of the oscillation compared to the distance between exposure points in the array may be optimized based at least in part on the desired scan speed or exposure time per field of view, the power of the motor, the vibrational load, the vibrational damping, the natural frequencies of components in the system and/or the moving mass of the platform. The amplitude of the oscillation may be greater than or equal to 100%, 105%, 110%, 115%, 120%, 130%, 140%, 150%, 160%, 170%, 180%, 190% or 200% of the distance between a first lenslet and a second lenslet of the array.

In some cases, the distance between a first lenslet and a second lenslet of the first beamlet forming element and/or the second beamlet forming element may be greater than or equal to about 0.5 mm, 1 mm 1.5 mm, 1.75 mm, 2 mm, 2.25 mm, 2.5 mm, 3 mm, 3.5 mm, 4 mm, 5 mm 6 mm, or greater. The distance between a first lenslet and a second lenslet of the first beamlet forming element and/or the second beamlet forming element may be less than or equal to about 0.5 mm, 1 mm 1.5 mm, 1.75 mm, 2 mm, 2.25 mm, 2.5 mm, 3 mm, 3.5 mm, 4 mm, 5 mm 6 mm, 8 mm, 12 mm or greater. The distance between a first lenslet and a second lenslet of the first beamlet forming element and/or the second beamlet forming element may be between any two values described herein, for example between about 1.5 mm and about 2.5 mm. The spacing between a plurality of lenslets of a beamlet forming element (e.g., the first beamlet forming element or the second beamlet forming element) may be uniform across the beamlet forming element.

The lenses may be shaped in a pattern. The pattern may be a rectangular, hexagonal or square. The pattern may include a radial pattern. The radial pattern may move focal points of one or more beamlets across the field of view of the sample. The radial pattern may be a spiral for example an Archimedean spiral with multiple spirals of lenslets making up a single pattern.

The oscillation rate of the system (e.g., of the platform comprising the beamlet forming elements and the pinhole arrays) may be greater than or equal to about 1 Hz, 2 Hz, 3 Hz, 4 Hz, 5 Hz, 6 Hz, 7 Hz, 8 Hz, 9 Hz, 10 Hz, 15 Hz, 20 Hz, 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 110 Hz, 120 Hz, 130 Hz, 140 Hz, 150 Hz, 170 Hz, 200 Hz, or greater. The oscillation rate may be less than or equal to about 1 Hz, 2 Hz, 3 Hz, 4 Hz, 5 Hz, 6 Hz, 7 Hz, 8 Hz, 9 Hz, 10 Hz, 15 Hz, 20 Hz, 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 110 Hz, 120 Hz, 130 Hz, 140 Hz, 150 Hz, 170 Hz, 200 Hz. The oscillation rate may be between any two values described herein, for example between about 10 Hz and about 100 Hz. A lower oscillation rate would increase the exposure time of each point within the field of view. A longer exposure time may increase the signal. In some embodiments, the system may oscillate and expose the field of view with a first frequency (or speed or exposure time) and then image the same field of view with a second or third frequency. Taking more than one scan of the field of view at different scan speeds and computationally combining the results can be used to form a high dynamic range (HDR) image.

The first beamlet forming element may be different than the second beamlet forming element. The first and second beamlet forming elements may comprise different configurations of lenslets, different spacing of lenslets, or different optical properties of the lenslets. The optical properties of the lenslets may include, but are not limited to, the focal length of the lenslets, the diameter of the lenslets, the material of the lenslets, and/or the orientation of the lenslets.
Flat Fielding The excitation light source that strikes the excitation beamlet forming element is ideally uniform in intensity across the entire area of the beamlet forming element that is being illuminated. Many light sources (for example, lasers, LEDs, lamps, QD-LEDs, VCSELs, OLEDs, SLED) are not very uniform and often have a Gaussian profile or other significantly shaped profile in which the center of the beam is significantly brighter than the edges.

"Lasers" as used herein refers to traditional LASERs (Light Amplification by Stimulated Emission of Radiation), Vertical Cavity Surface Emitting Lasers and other laser and laser derivative optical illumination sources. "LEDs" as used herein refers to Light Emitting Diodes, MicroLEDs, Quantum-Dot LEDs (QD-LEDs), Organic LEDs (OLEDs), Superluminescent LEDs (SLEDs) and other LED and LED technology derivatives. Various techniques may be employed to flatten the field to homogenize the illumination field. Some such techniques may include: liquid light guides, light pipe homogenizers, homogenizing rods, beam homogenizers, diffractive homogenizers, mirrored tunnels, lenses and lens arrays, fly-eyes, diffusers, diffuse scattering films and combinations of these and other optical elements.

Some imaging systems described herein may comprise multi-color modalities. The multi-color modalities may provide an illumination beam of a color (e.g., of a wavelength range) to the sample. The wavelength of the illumination beam may be in the visible range or outside the visible range (e.g.—IR and UV). Wavelengths may include 355 nm, 375 nm, 405 nm, 477 nm, 488 nm, 545 nm, 555 nm, 637 nm and 748 nm. The imaging system may comprise a multi-color illumination source. The multi-color illumination source may comprise two or more Laser or LED lights in optical communication via a series of dichroic mirrors, such that any combination or sequence of the two or more Laser or LED lights may generate a multi-colored illumination beam. The multi-colored illumination beam may exhibit a single color at a time, with multiple colors in sequential pulses. The multi-colored illumination may also exhibit two or more colors at a time. The multi-color illumination sources may be used for multiplex microscopy. Multiplex microscopy may be used to stain for various markers of interest. The collection unit may comprise one or more cameras configured to receive different signals from the emission beam. For example, the collection unit may comprise two or more cameras, where each sequential camera of the two or more cameras may be in optical communication with the emission beam via at least one dichroic (or polychroic) mirror. In other embodiments, the emission light may pass through a prism or other optics to spread the wavelengths of emission light, which can then be received by one or more cameras or sensors. A series of dichroic mirrors may segment the emission beam into wavelength portions. Each camera of the two or more cameras may image a different wavelength section than another camera. In some embodiments, hyperspectral imaging of the emission beams is possible by spreading the emission beam after the emission beamlet forming element using a non-deviating prism, a regular prism, a diffraction grating or other optical dispersion element.

Figure 10:
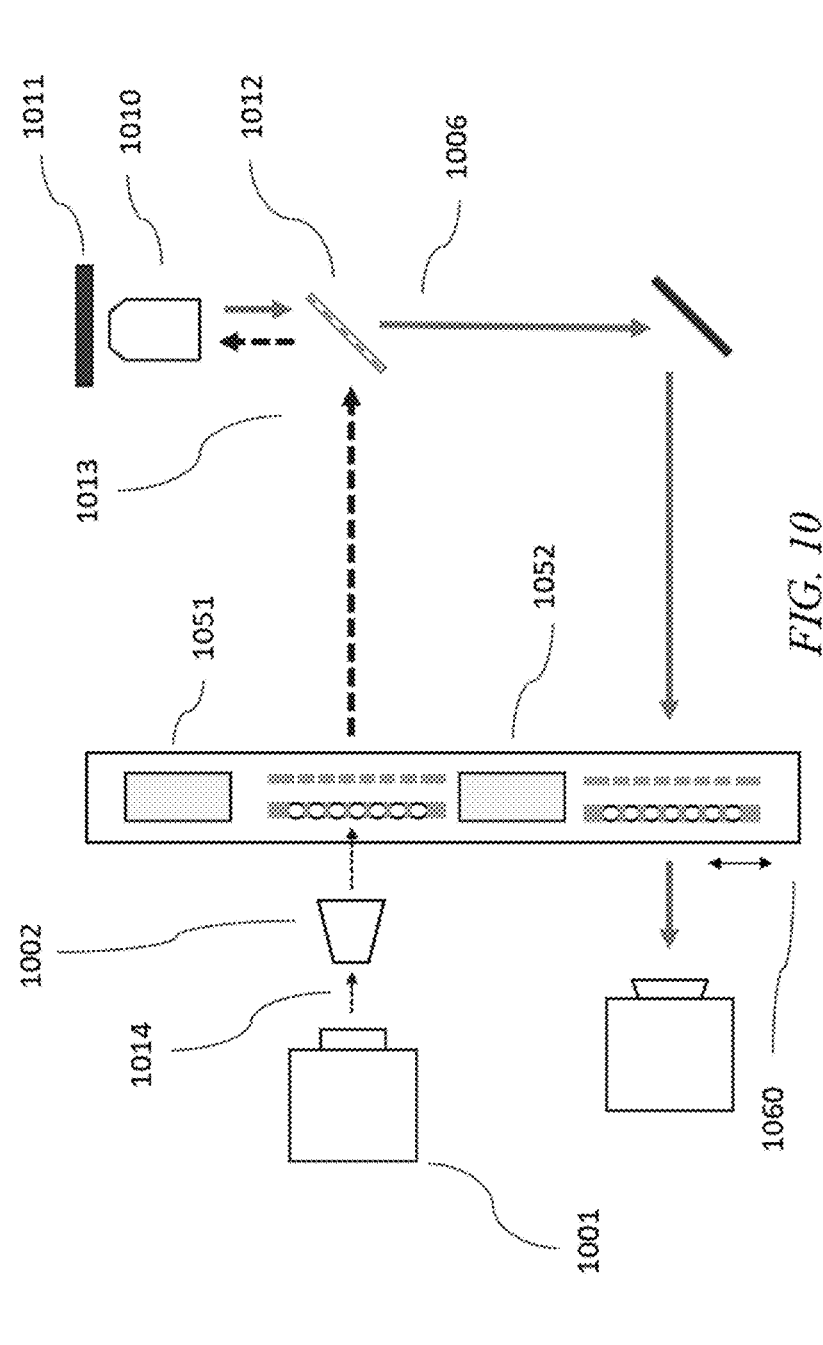
FIG. 10 shows a linear iSIM imaging system with additional imaging modalities, in accordance with some embodiments described herein.

FIG. 10 shows an example of an imaging system for linear iSIM with alternative imaging modalities. The system of FIG. 10 comprises a long travel linear stage 1060 comprising the beamlet forming elements and pinhole arrays described herein. The long travel linear stage further comprises a first optical element 1051 and a second optical element 1052. The long travel linear stage may oscillate to scan the array of illumination beams across the field of view of the sample. The long travel linear stage may also translate to position the first optical element 1051 and/or the second optical element 1052 in the illumination path and excitation path respectively. The linear stage may oscillate at a portion of a dimension of the beamlet forming element. For example, if the beamlet forming element is 25 mm in diameter, the linear stage may oscillate for iSIM in the range of 1-5 mm range and at 10-30 Hz as described herein. The system may switch imaging modalities (from iSIM) to a non-lenslet type of imaging (e.g., regular epi-fluorescent imaging) by moving the beamlet forming elements out of the optical path. The optical elements 1051 and 1052 may comprise clear apertures or windows or slits for spectral imaging or additional optical elements. The linear stage may comprise additional optical elements located adjacent to the beamlet forming elements and first and second optical elements on the linear stage. For example, 2, 3, 4 or more imaging modalities may be enabled by the long-travel linear stage comprising multiple optical elements in addition to the oscillating beamlet forming element. This arrangement is also possible with a series of rotary discs in which the discs oscillate thru some small angle (for example 5-10 degrees) and then rotate or index to other imaging modalities on a different section of the disc.

Figure 11:
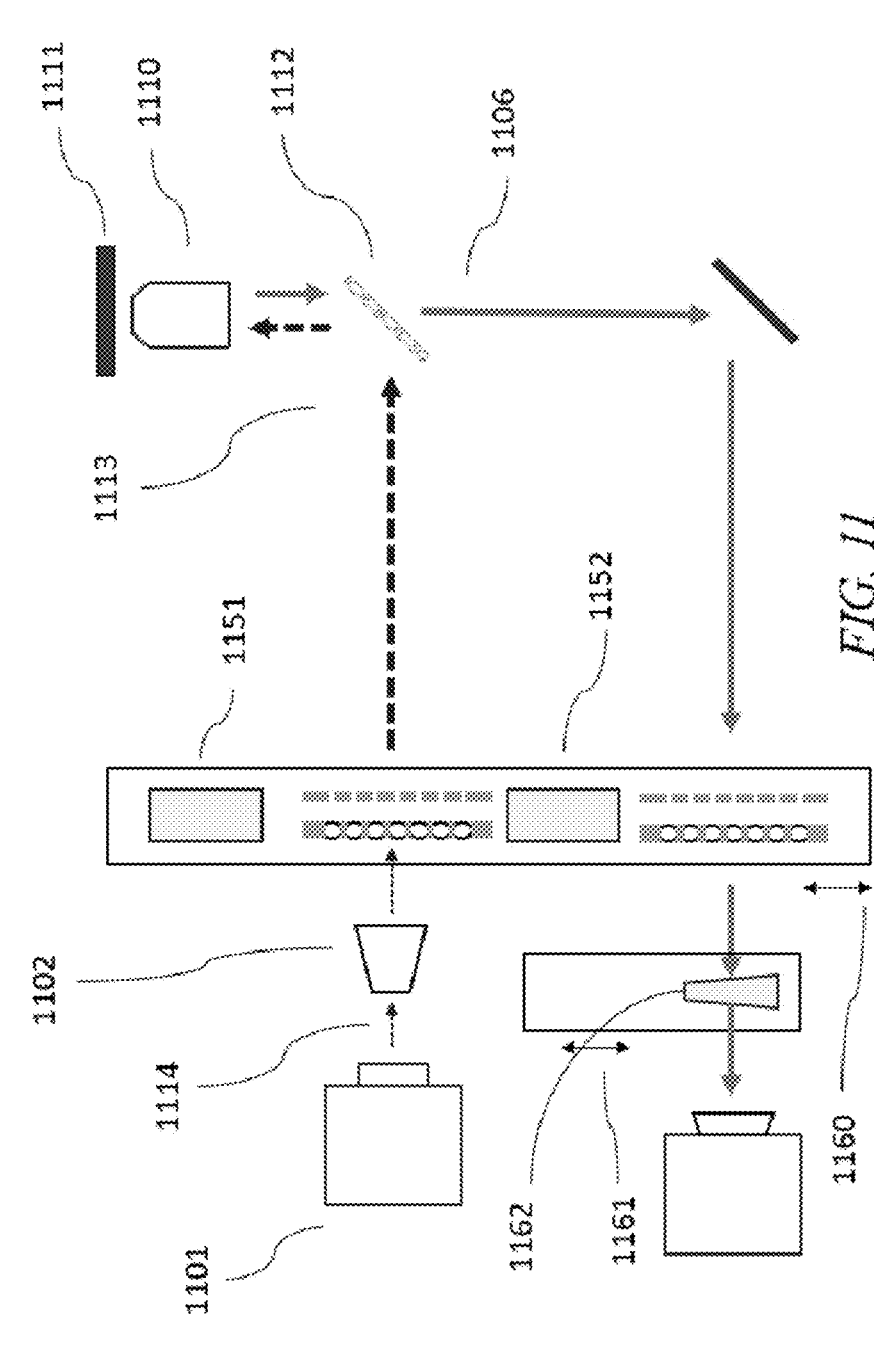
FIG. 11 shows a linear iSIM imaging system with hyperspectral emission collection, in accordance with some embodiments described herein.

FIG. 11 shows an example of an imaging system configured for hyperspectral imaging. The imaging system may comprise a diffraction optical element 1162. The diffraction optical element may comprise or be a prism or a grating. The diffraction optical element may be located on a second stage 1161. The diffraction optical element may be located in the optical path after the second beamlet forming element (e.g., the emission beamlet forming element). The diffraction optical element may be mechanically coupled to the linear oscillation stage of the emission beamlet forming element. Alternatively, the diffraction optical element may be located on a second stage not coupled to the linear stage. FIG. 11 shows a linear oscillation stage, but the diffraction optical element may be in an imaging system comprising a rotary disc stage.

Figure 12:
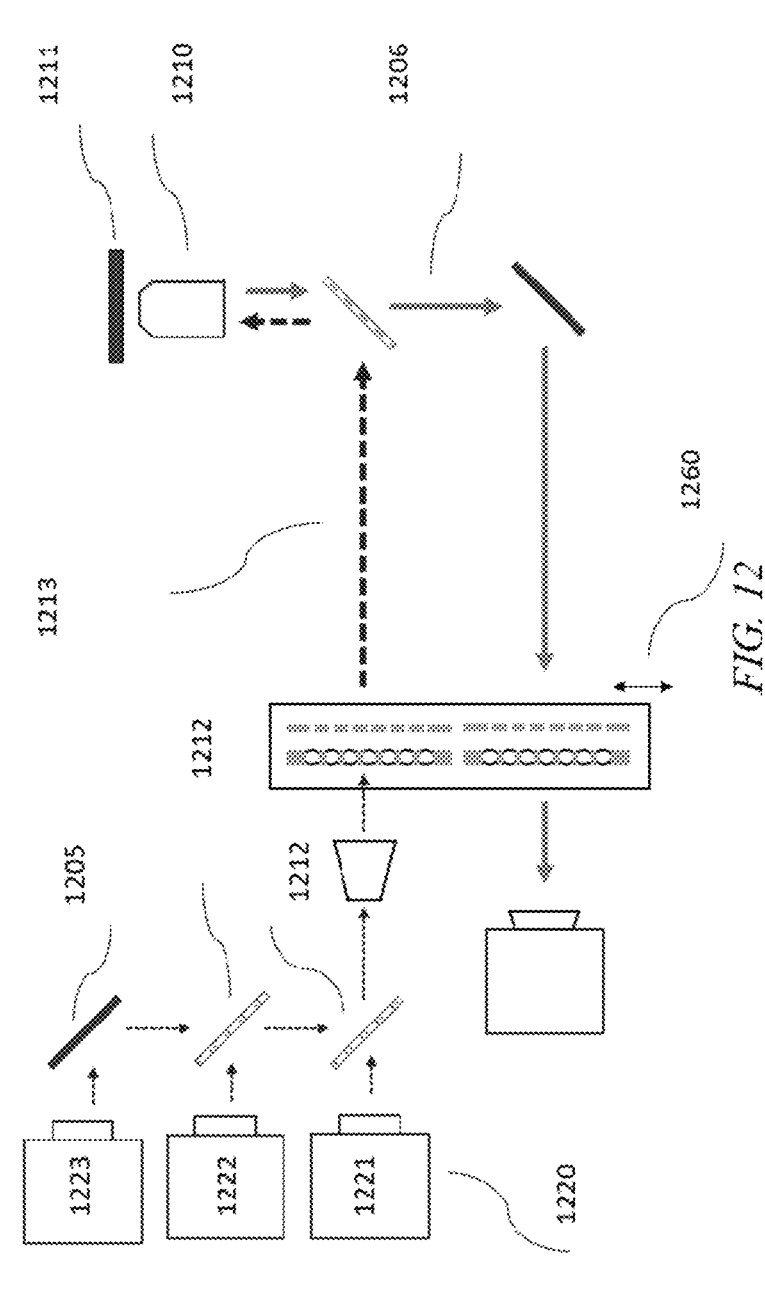
FIG. 12 shows a linear iSIM imaging system with multiple illumination sources, in accordance with some embodiments described herein.

FIG. 12 shows an example of an imaging system configured with one or more illumination sources. The illumination sources 1220 may comprise at least a first illumination source 1221 and optionally one or more additional illumination sources (1222, 1223). The one or more illumination sources may combine excitation beams through a dichroic mirror 1205 and one or more dichroic mirrors 1212. The number of illumination sources may be 1, 2, 3, 4, 5, 6, 7, 8, 9, 10, or higher. The illumination sources may be laser sources, LED sources, or a combination thereof. During operation, two or more illumination sources may be used sequentially one at a time. Alternatively, or in addition, the two or more illumination sources may be used at the same time. In some cases, multiple illumination sources may be used at the same time along with multiple collection units (e.g., cameras). FIG. 12 shows a linear oscillation stage, but the multiple illumination sources may be used with any other embodiment described herein (e.g., rotary, orbital, or moving stage embodiments) as well.

Figure 13:
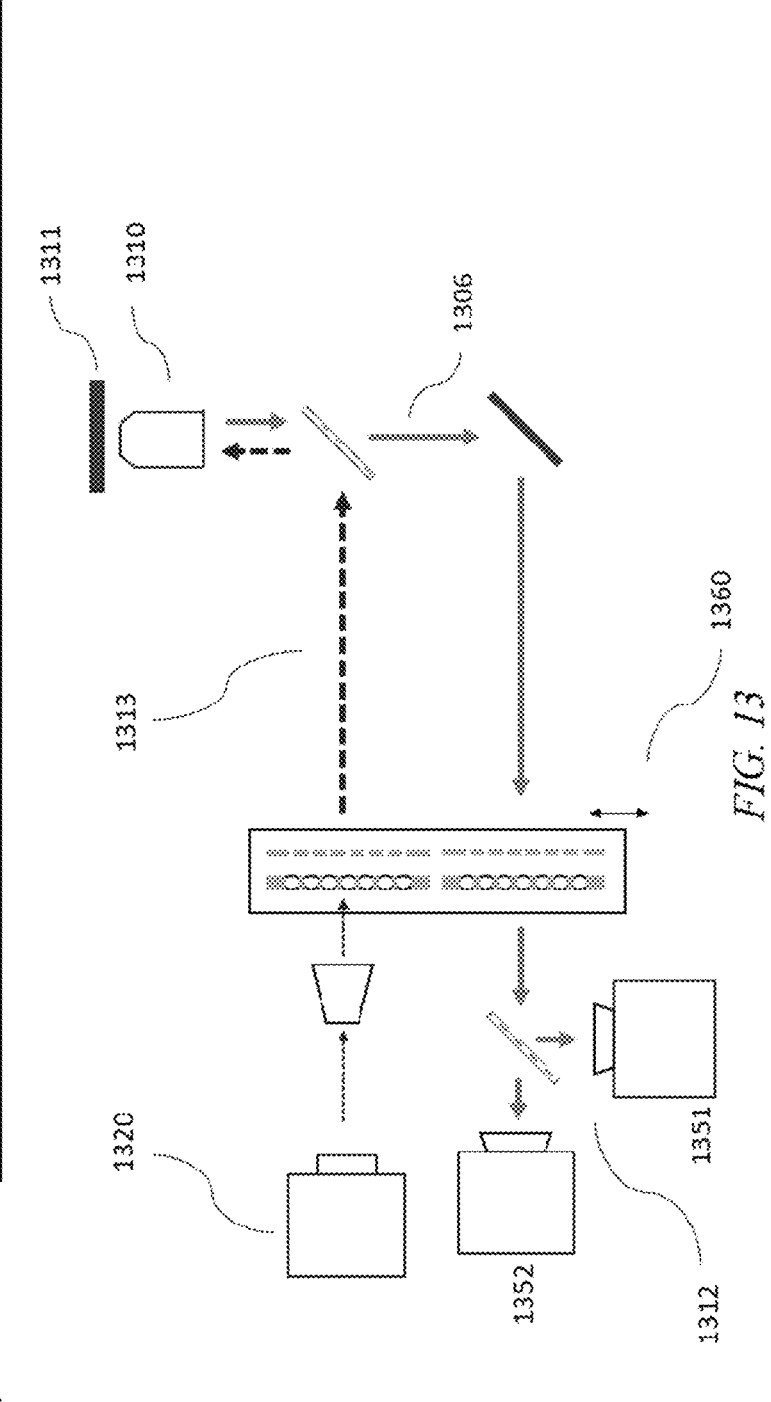
FIG. 13 shows a linear iSIM imaging system with multiple imaging devices, in accordance with some embodiments described herein.

FIG. 13 shows and example of an imaging system configured with multiple imaging devices. The first imaging device 1351 and second imaging device 1352 may receive separated emission beams. The emission beams may be combined through the objective 1310 and through the beamlet forming element and optional mask array. The emission beams may be separated to the first imaging device and second imaging device by a dichroic mirror 1312 located in the optical path between each imaging device and the emission beamlet forming element. The imaging system may comprise 1, 2, 3, 4, 5, 6, 7, 8, 9, 10 or greater imaging devices. In some cases, multiple imaging devices may take more than one fluorescent image simultaneously. For example, one or more illumination sources may illuminate the sample at 405 nm and 635 nm and the objective may collect the emission signals. The dichroic may separate the emission from the 405 nm excitation to be directed to a first imaging device and the emission from the 635 nm excitation to be directed to a second imaging device. In another example, the sample may comprise two or more dyes that are excited by a single wavelength but produce multiple sufficiently different wavelengths such that the emission from dye 1 goes to a first imaging device and the emission from dye 2 goes to a second imaging device. More than two dyes and imaging devices may be used. FIG. 13 shows a linear oscillation stage, but multiple imaging devices may also be used with any other embodiment described herein (e.g., rotary, orbital, or moving stage embodiments) as well.

Figure 14:
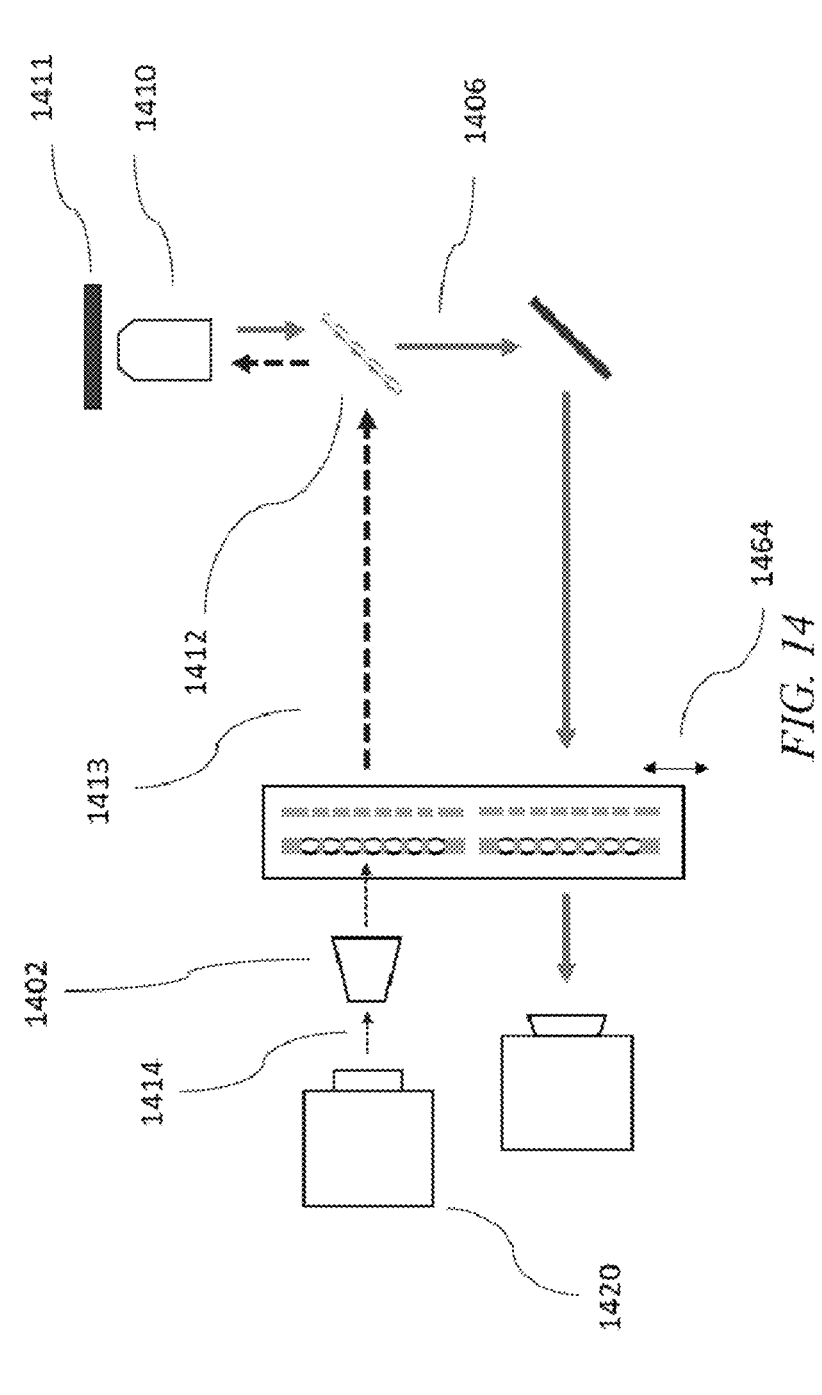
FIG. 14 shows an iSIM imaging system with a non-linear motion pattern, in accordance with some embodiments described herein.

FIG. 14 shows an imaging system with an orbital oscillation stage. The oscillation stage 1464 may oscillate in a motion pattern that is not linear. The motion (e.g., the motion of the beamlet forming element and/or pinholes) may be elliptical, circular, oval, racetrack, or other motion pattern. A non-linear oscillation motion pattern may allow for faster oscillation frequency than a linear oscillation. A non-linear oscillation motion pattern may paint the entire field of view.

Figure 15:
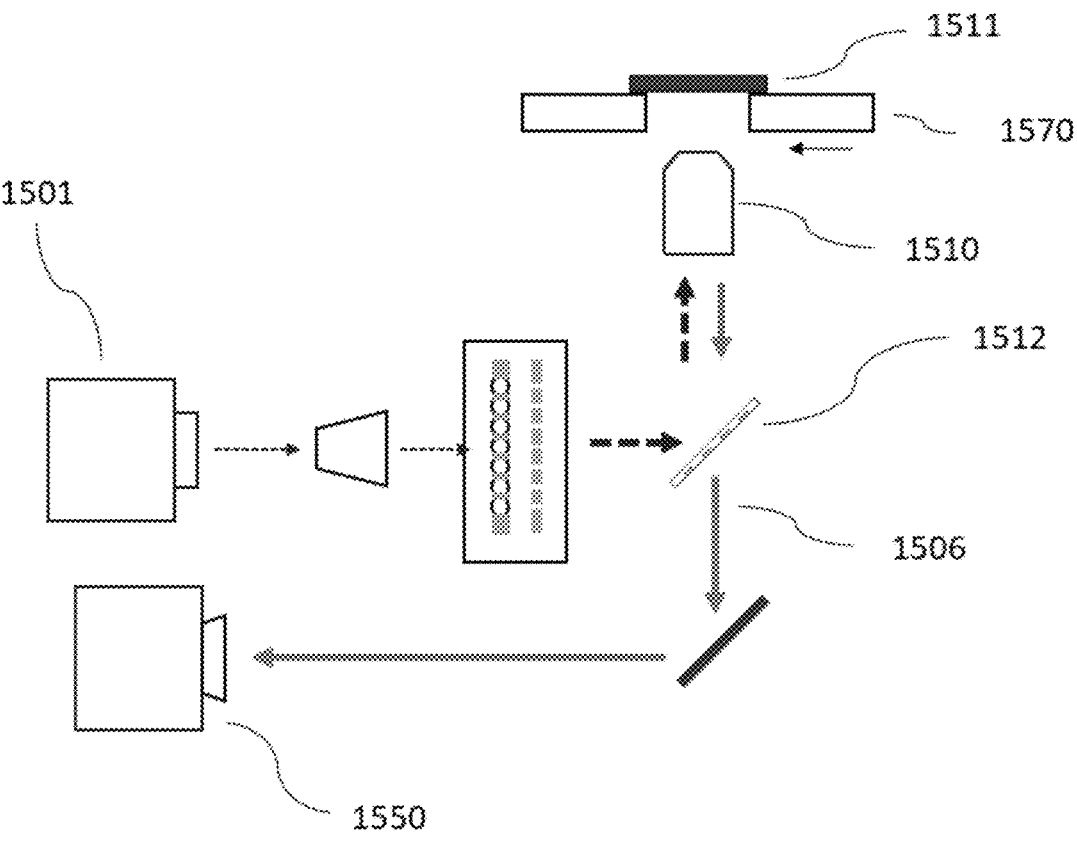
FIG. 15 shows a linear iSIM imaging system, in accordance with some embodiments described herein.

FIG. 15 shows an example of an imaging system with a sample mounted to a moving stage. In contrast with other embodiments described herein, the system shown in FIG. 15 may not oscillate the beamlet forming elements and/or pinhole arrays. Instead, the imaging system may move the sample 1511 mechanically coupled to the stage 1570. The beamlet forming element, pinhole array, and/or mask(s) create a specific illumination pattern on the sample. The pattern may be designed such that as the sample is translated by the stage 1570, every point in the field of view of the sample is illuminated at least once by the optical pattern. In some embodiments, only the excitation side has a beamlet forming element and optional pinhole array and the emission side has no emission beamlet forming element or pinhole/mask array.

Figure 16A:
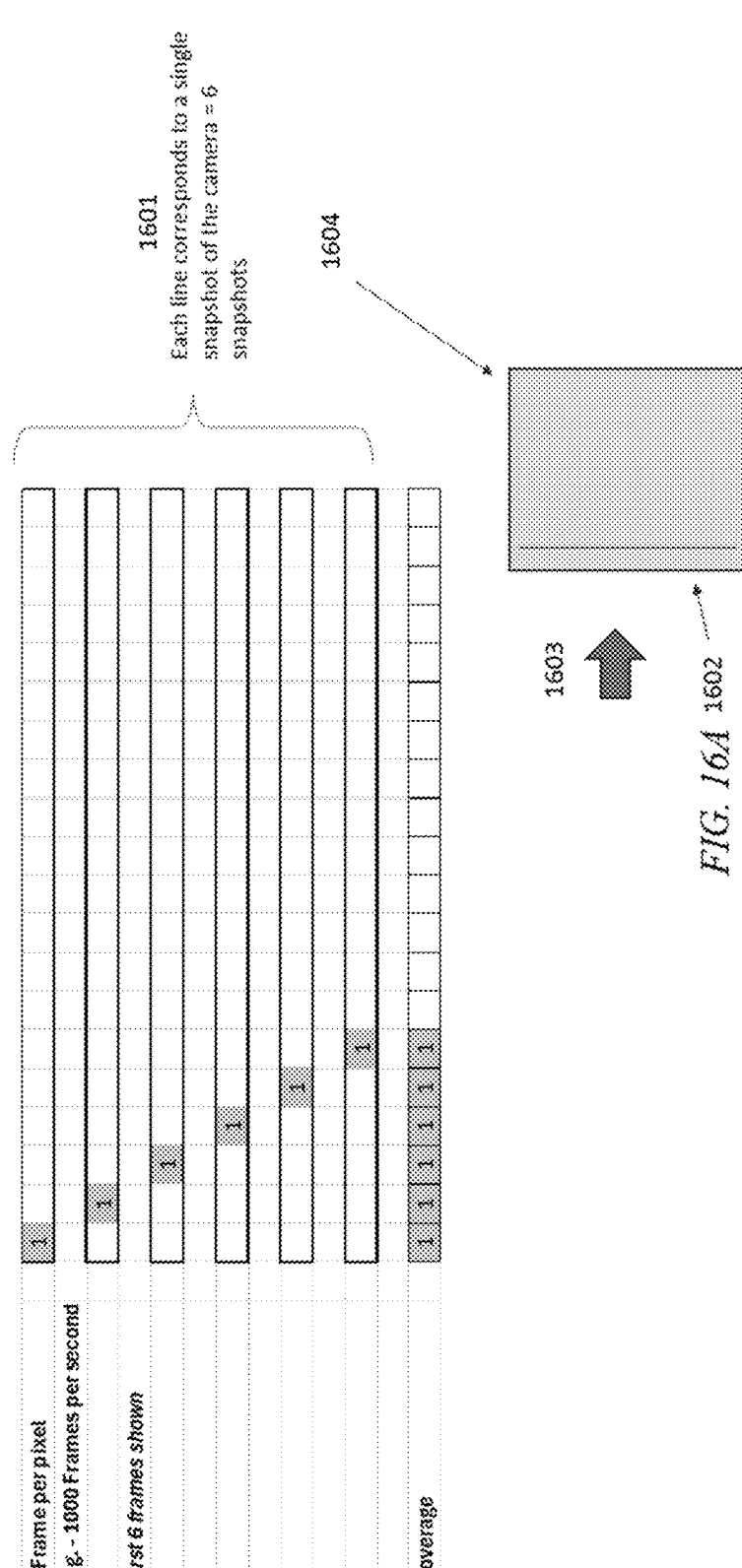
FIG. 16A-C shows a one-dimensional stagger pattern for iSIM imaging systems, in accordance with some embodiments described herein.
Figure 16B:
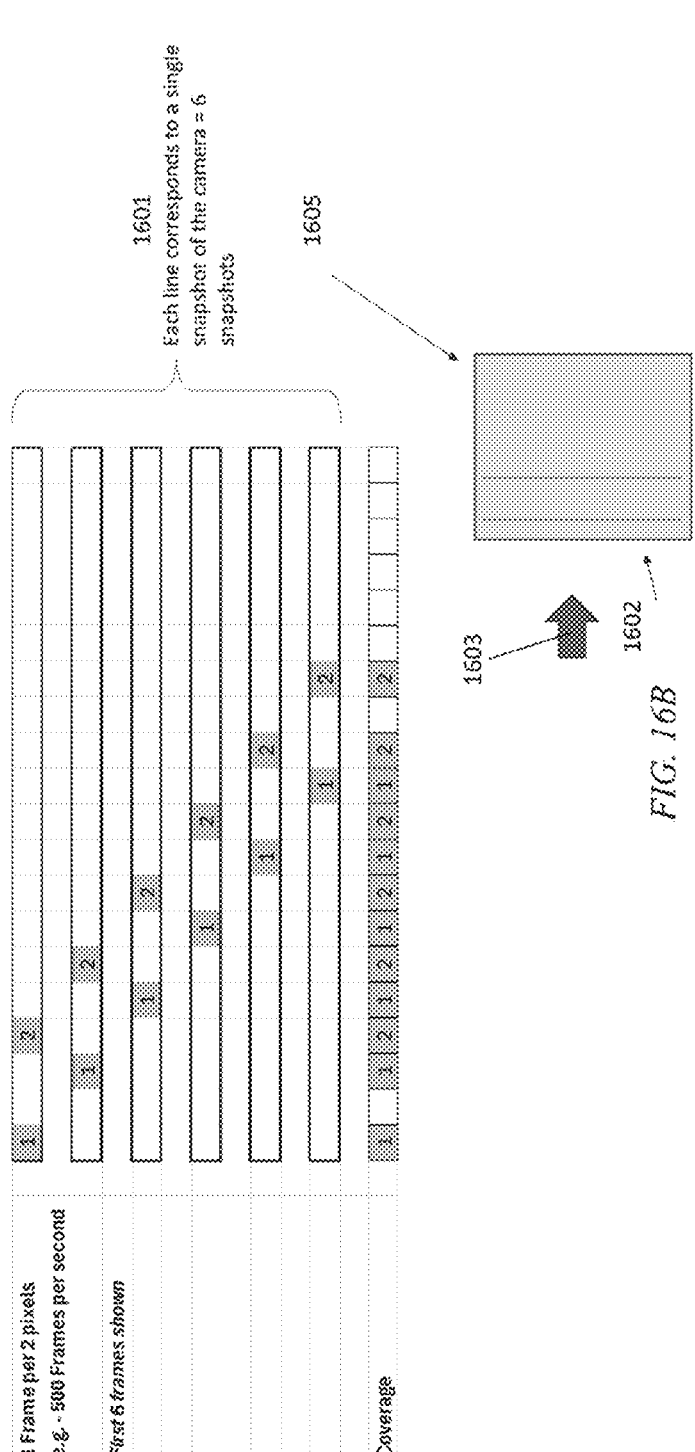
Figure 16C:
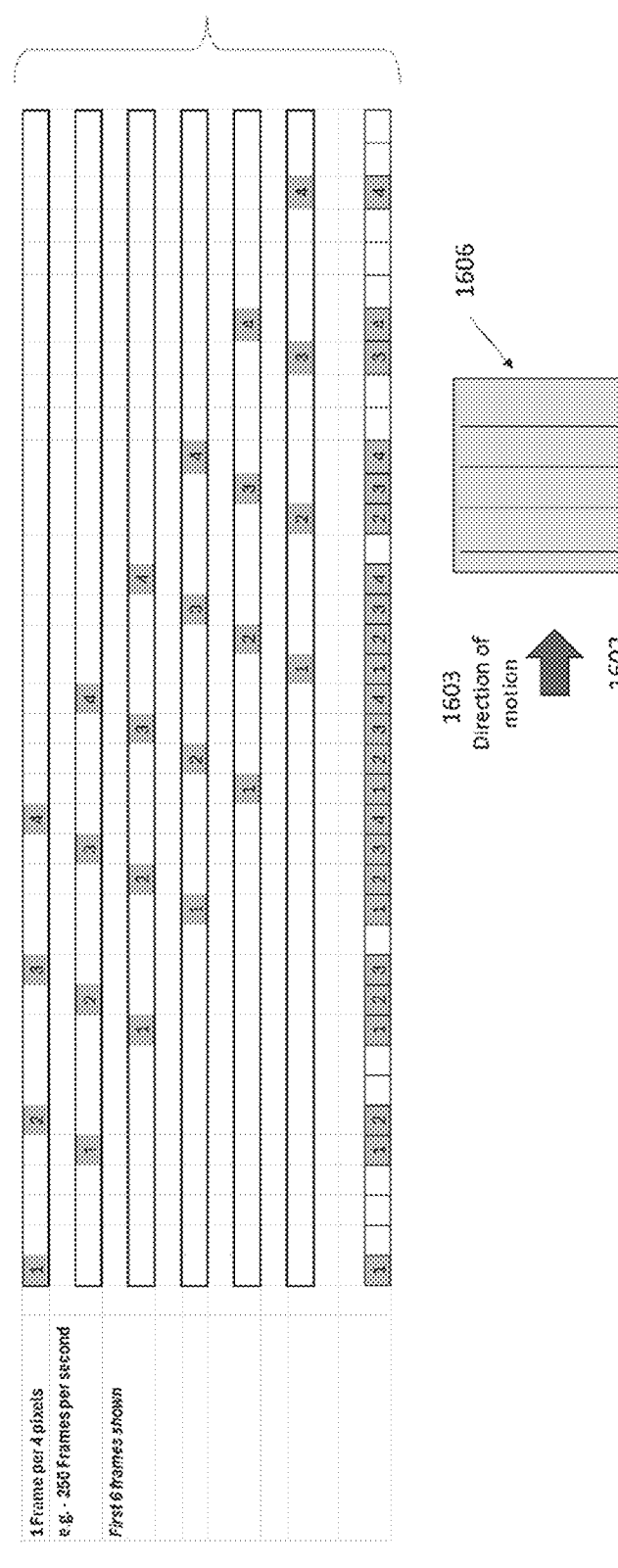

The imaging device may take images at a rate based at least in part on the scanning speed. For example, if the imaging device had 1000 horizontal pixels and the scan rate of the stage was equal to 1 field of view per second, the frame rate of the imaging device may be set to 1000 frames per second (e.g., one pixel per frame). Alternatively, the values for each camera pixel may be shifted at a speed matched to the scan speed. The imaging system may record a whole field of view (i.e. or a significant portion of a field of view) at a lower frame rate (e.g., less than 1000 pixels/second) with a shift rate of 1 pixel every 1000th of a second. This method may be similar to time domain integration methods, but there is no integration. In further embodiments, multiple points or lines of illumination may allow the frame rate to be reduced by a factor of 2, 3, 4, 5, 6, 7, 8 or greater because in one frame multiple locations in the field of view are illuminated. FIGS. 16A-C illustrate the concept of stagger patterns described above.

FIG. 16A shows each line corresponds to a single snapshot of the camera 1601. 6 lines represents 6 frames. 1602 shows a field of view with a one-dimensional illumination pattern (e.g., a line) shown in the field of view. The line is moved in the direction of scanning motion 1603. A single line of illumination has multiple overlapping point spread functions (PSFs) which may make it more challenging to deconvolve the PSFs. However if two or more non-parallel lines sweep across the FOV, deconvolution of the PSF may be possible when each of the line widths is minimized such that it is at or near the diffraction limit. Described herein are more advantageous methods of moving SIM that result in methods that can fully deconvolve the PSFs. The illumination pattern(s) may be created by beamlet forming elements and/or masks separately or together.

FIG. 16B uses two illumination lines rather than one as described in 16A. When imaging starts for 16B, the full field of view is only illuminated with one of the two lines. The embodiment shown in FIG. 16B can image at half the frame rate as 16A, but there is a "startup cost" in which the first snapshot is not fully utilized. The second snapshot is illuminated by both lines and all subsequent images taken use both line except for the very last image which again uses only one line. Two lines of illumination 1605, when properly spaced, may allow for the frame rate to be cut in half from the embodiment described in 16A.

FIG. 16C shows an example with 4 lines of illumination 1606. When properly spaced, this may allow the camera frame rate to be 4 times less than a single illumination line configuration. The "startup cost" shown by FIG. 16C is that the first three snapshots are not fully utilized. The advantage is that four illumination lines allows the image to be acquired four times as fast if the frame rate of the camera is fixed. It should be noted that any number of lines may be used from 1 to over 500 with the primary limit being that lines should not be spaced so closely that the resulting emission lines line spread functions overlap significantly. It should also be noted that this same technique to reduce frame rates can be used but with lines that are not perpendicular (and not parallel) to the movement of the stage (for example—slanted lines). By utilizing multiple lines that pass over the sample in the same location but at different angles, the individual PSFs can be deconvolved from the measured emission line spread functions.

Figure 17:
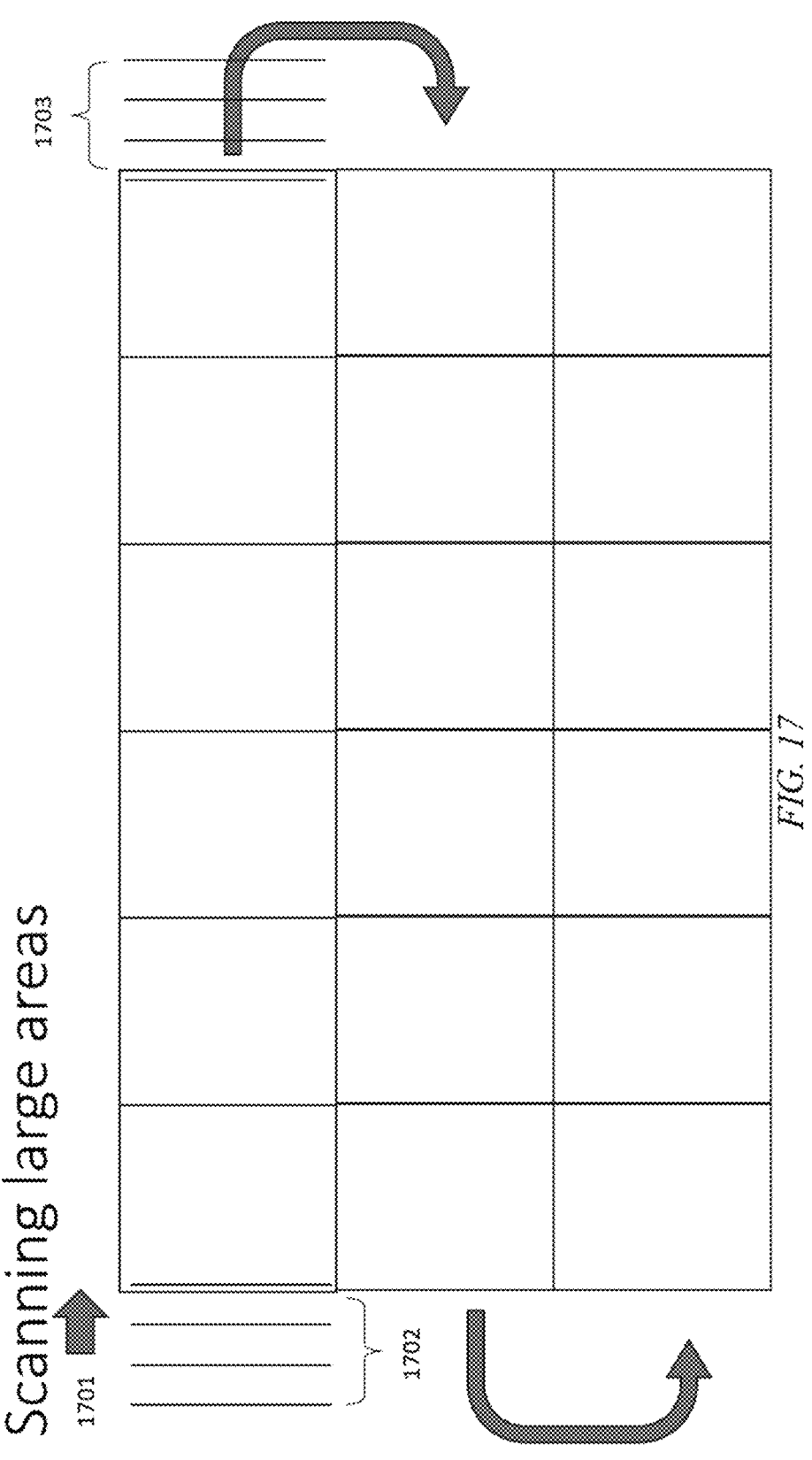
FIG. 17 shows lost imaging costs when scanning across a field of view, in accordance with some embodiments described herein.

FIG. 17 shows that when scanning large areas with multiple lines of illumination, there is a startup cost 1702 and an ending cost 1703. The ending cost is that some of the lines of illumination may need to be scanned outside the field of view of the sample in order for other lines to complete the respective scan of the area. It is important to note that in this system there is not a startup and ending costs for each field of view but instead for each row of scanned plurality of fields of view. There is a starting and ending cost for each start of a new direction of scanning across the area. This is therefore a particularly fast and effective means for scanning large areas with minimal hardware.

Figure 18:
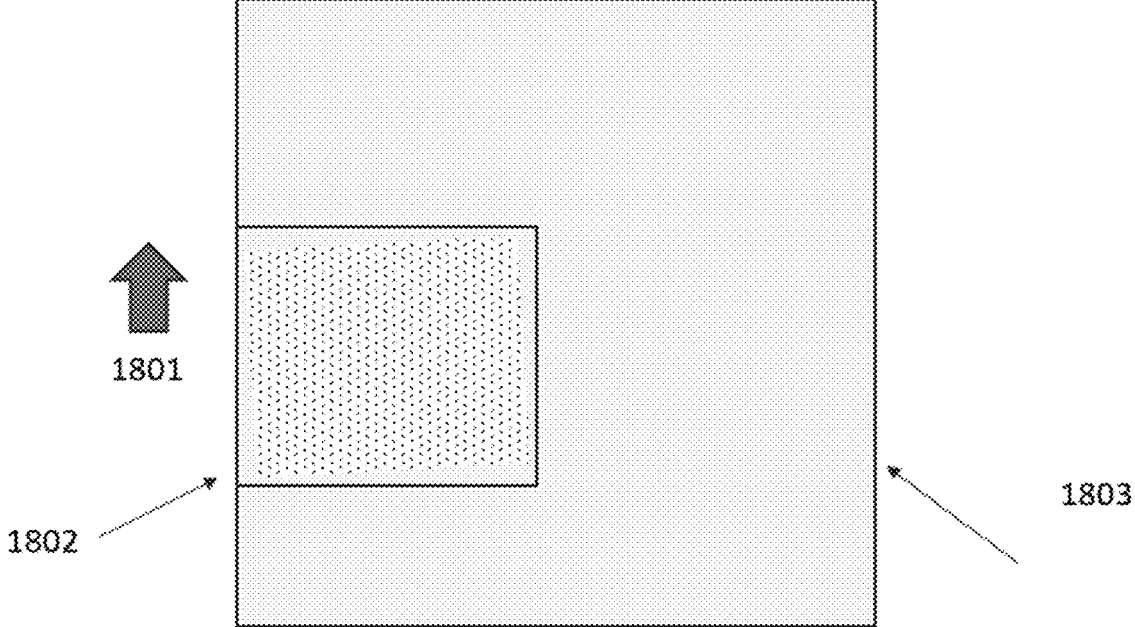
FIG. 18 shows additional illumination patterns for iSIM imaging, in accordance with some embodiments described herein.

Using only horizontal lines perpendicular to the scan direction, is not an optimum pattern for moving SIM. FIG. 18 shows an improved pattern—diffraction limited dots. The same scanning principles and frame rates may be applied for other patterns (e.g., diffraction limited dots) to reduce frame rate or increase imaging acquisition speed. In FIG. 18, the field of view 1802 is scanned in the direction of motion 1801 over the whole sample 1803. The diffraction limited dot array may be oriented at a slant with respect to the direction of motion. That is, dots are arranged such that when scanned over the field of view, each dot trace just touches the adjacent dot trace. The preferred spacing of dots from one column to another is such that they do not significantly overlap nor do they leave a significant gap. Each dot of light may be at or near the diffraction limit or resolution limit of the optical system. The array of dots may be arranged such that all parts of the sample to be imaged will be illuminated by a dot of illumination at some point during the motion of the dot array over the sample. For example, the array of dots may be moved in a first direction while the array of dots is arranged in a grid rotated at a small angle relative to the direction of motion. The array of illumination dots may be achieved with one or more of a mask, beamlet forming element, or other optical element.

Figure 19:
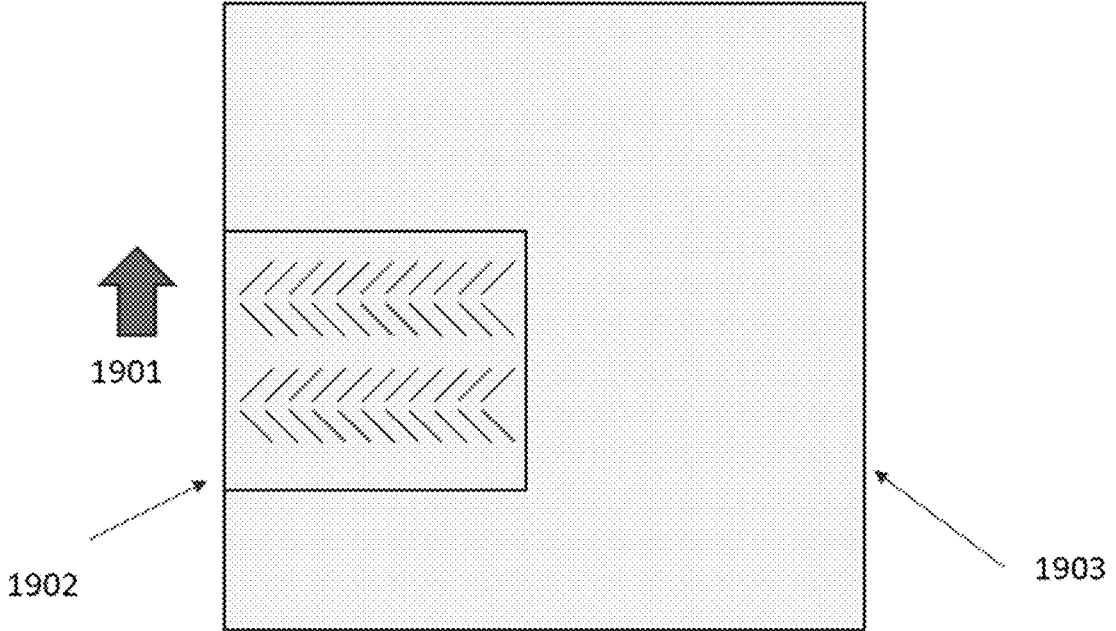
FIG. 19 shows additional illumination patterns for iSIM imaging, in accordance with some embodiments described herein.

In another aspect, the imaging system may comprise a more compact structured light arrangement. The light pattern may comprise one or more continuous lines of illuminated light. FIG. 19 shows an example of an alternative pattern for moving SIM. FIG. 19 shows an example of multiple rows of lines slanted with respect to the direction of motion 1901. With this pattern, a sample point in the field of view may be imaged more than once. Compiling the additional points and images, a super resolution image can be computed.

In some cases, multiple lines of illumination will scan across the sample. By scanning multiple differently angled lines of illumination over the same single point on the sample, a full PSF can be deconvolved using computation algorithms. For example, two rows of multiple lines may be scanned across a sample along a direction. Shown in FIG. 19 is two sets of two slanted rows of lines. Each point on the sample will be imaged once by a line slanted to the left and once by a line slanted to the right. The use of two sets enables the camera to be used at one half the frame rate as described in FIG. 16B. This provides the benefit of allowing an algorithm to deconvolute the full PSF of each point from the compiled scan of the point by each line of illumination with a different orientation. It should be noted that any number of sets of slanted lines may be used from 1 to more than 100 with the reduction in camera frame rate proportional to the number of sets as described in FIGS. 16A-C. Furthermore, while FIG. 19 describes the use of two differently slanted lines non-parallel to the direction of motion, more than two may be used as described in FIG. 20.

Figure 20:
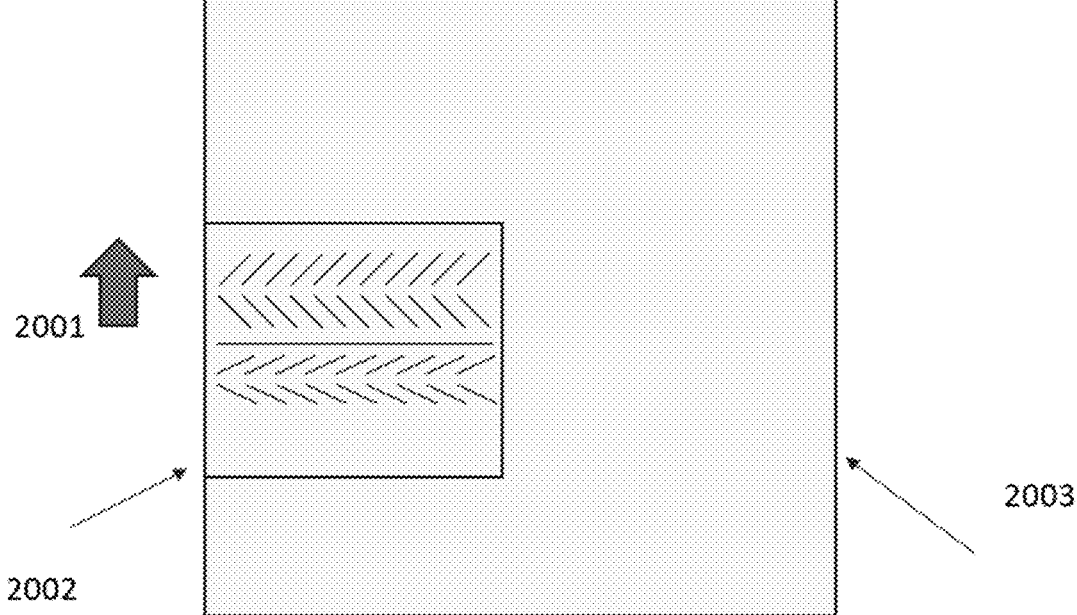
FIG. 20 shows additional illumination patterns for iSIM imaging, in accordance with some embodiments described herein.

FIG. 20 shows a single set of five differently slanted rows of lines, designed such that each point in the field of view will be illuminated by each line one time. Additional resolution and some level of redundancy and/or error-checking can be achieved by using more than two sets of differently slanted lines which illuminate each point for the computational algorithm which is then used to extract each individual point spread function (PSF). As noted in FIG. 19, more than one set of five differently slanted lines may be used to reduce the frame rate. Further, while FIG. 16A-C described using a single line, FIG. 19 described using two differently slanted lines and FIG. 20 described using five differently slanted lines; 3 sets, 4 sets or more than 6 sets of differently slanted lines may be used.

Furthermore, we have described a moving SIM system using a single wavelength, however more than one wavelength can be used simultaneously across the field of view at the same time while continuously scanning. For example, FIG. 21A shows four lines of illumination 2111, 2112, 2113, and 2114. Each line provides a different wavelength of signals. For example, the first line 2111 may be a red color (~650 nm) and the second line 2112 may be a green color (~540 nm). By passing over the sample, the entire FOV 2102 is imaged with the four different wavelengths of the four illumination beams. FIG. 21B shows an example of multiple rows of illumination beams where a first set of rows of illumination beams (2121) images at a first wavelength and the lines in that set are both not parallel to the direction of motion (2101) and not parallel to one another to allow for super resolution image reconstruction. A second set of rows of illumination beams (2122) images at a second wavelength. A third set of rows of illumination beams (2123) images at a third wavelength. A fourth set of rows of illumination beams (2124) images at a fourth wavelength. FIG. 21C shows a moving pattern where the patterns are dots and four different colors are used at the same time. The first dot pattern may be tilted at a small angle relative to the direction of motion 2101 such that each dot trace just touches the dot trace in the adjacent column. Each dot pattern 2131, 2132, 2133 and 2134 may be of different wavelengths and the field of view scanned such that every point on the field of view is imaged by a dot of each wavelength once. FIG. 21A-C describe the use of four colors simultaneously rather than one, however, 2, 3 or more than 5 colors may also be used.

Figure 21:
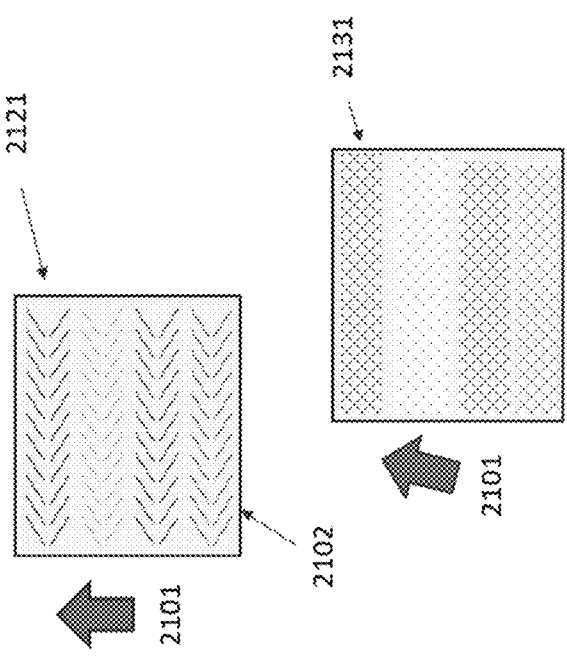
FIG. 21 shows multi-colored illumination patterns for iSIM imaging, in accordance with some embodiments described herein.
Figure 21:
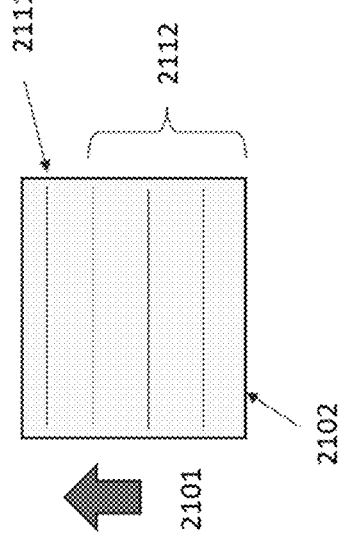
Figure 21:

Imaging systems described herein may provide multi-color moving SIM imaging. Other, non-moving SIM systems typically dedicate an entire field of view to a single emission color. To image in multiple colors (e.g., four colors), multiple imaging passes (e.g., four passes or 4 sequential images of the same FOV) are typically required. The moving SIM methods and systems described herein allow for multi-color imaging without requiring additional passes for additional colors. FIG. 21 shows an example of four-color imaging with a moving SIM light pattern of diffraction limited horizontal lines, rows of diffraction limited slanted lines, or diffraction limited dots.

Figure 22:
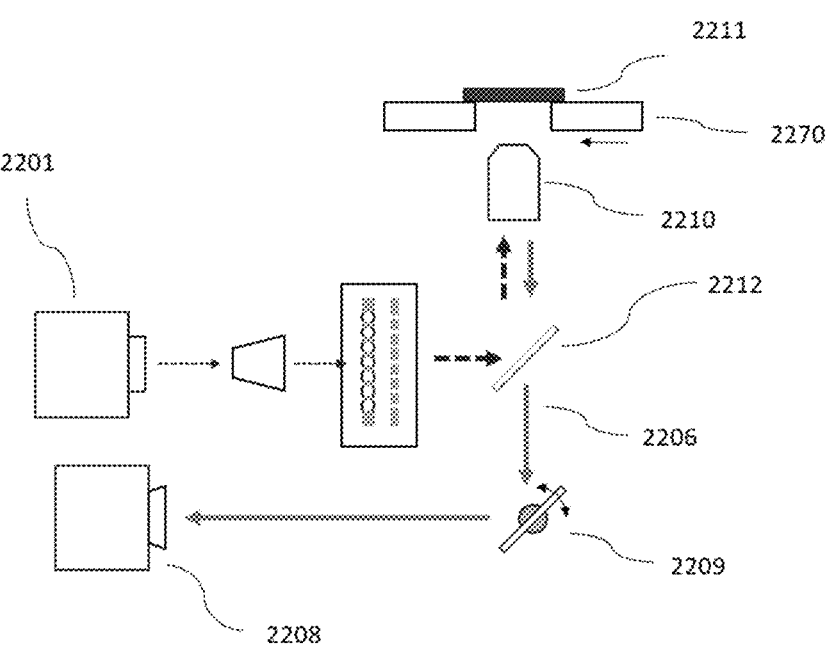
FIG. 22 shows a linear iSIM imaging system, in accordance with some embodiments described herein.

FIG. 22 shows an example of an imaging system with an optical mask (e.g., excitation beamlet forming element with optional pinhole array) on the excitation pathway and a galvanometric mirror 2209 in the emission pathway. The sample 2211 is coupled to a stage 2270 which moves the sample with respect to the illumination beam. The galvanometric mirror coordinates with the movement of the stage 2270 and sample 2211 to paint the emission beam across the camera 2208 field of view. The scanning speed of the galvanometric mirror may be greater than or equal to the scan speed of the stage to prevent overlapping emission signals and allow for computationally deconvolving of the point spread function. The galvanometric mirror may be a single axis, single sided galvanometric mirror. This embodiment requires the camera to acquire multiple images and compress the PSF and thus is a lower cost and more compact version of a SIM method.

Figure 23:
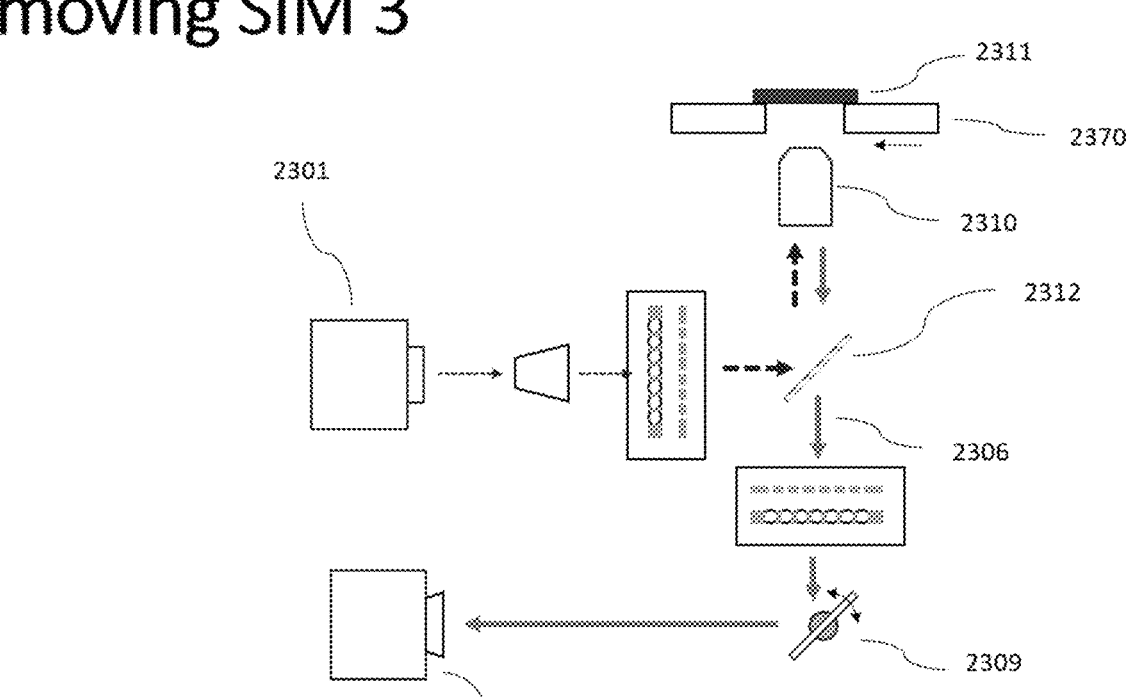
FIG. 23 shows a linear iSIM imaging system, in accordance with some embodiments described herein.

FIG. 23 shows an example of an imaging system with an optical mask (e.g., excitation beamlet forming element with optional pinhole array) on the excitation pathway, an optical mask (e.g., excitation beamlet forming element with optional pinhole array) on the emission pathway and a galvanometric mirror 2309 in the emission pathway. The sample 2311 is coupled to a stage 2270 which moves the sample with respect to the illumination beam. The galvanometric mirror coordinates with the movement of the stage 2370 and sample 2311 to paint the emission beam (e.g., emission beamlets from the emission optical mask) across the camera 2308 field of view. The scanning speed of the galvanometric mirror may be greater than or equal to the scan speed of the stage to prevent overlapping emission signals. This embodiment uses the emission side beamlet forming element and optional pinhole array and thus is a lower cost and more compact version of an iSIM method. The single axis, standard single sided galvo 2309 may be located in the emission path adjacent to the collection unit. The system may be configured to direct the light path to the galvanometric mirror once. It may be an advantage over imaging systems which direct a light path to the same galvanometric mirror multiple times. The imaging system may comprise a sample stage configured to translocate perpendicular to an optical axis of the illumination beam contacting the sample.

Figure 26:
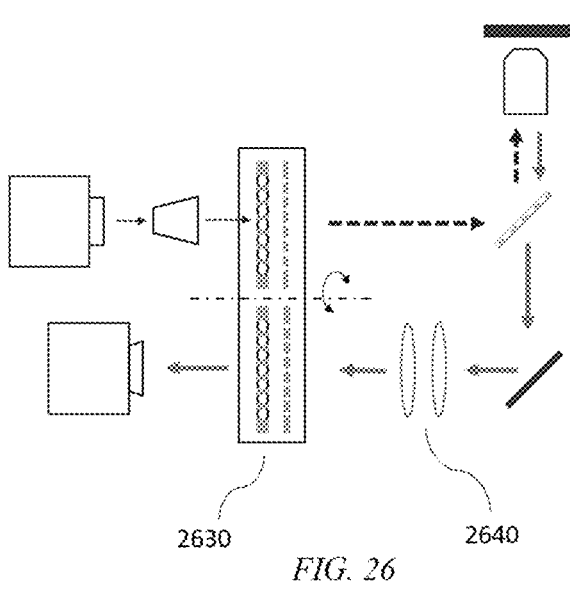
FIG. 26 shows a single disk version of an iSIM imaging system, in accordance with some embodiments described herein.

FIG. 26 shows an example of an iSIM imaging system with one disc. The excitation beamlet forming element and the emission beamlet forming element may be located on a single disc 2630. The disc may rotationally translate (e.g., spin). Alternatively, the disc may rotationally oscillate. In the example of a single disc imaging system, the system may further comprise one or more inverting optical element(s) 2640. Alternatively, the system may comprise additional turn mirrors configured to direct said emission signal from said sample around said disc to pass through said disc in the same direction as said excitation beam. A spinning disc may be disadvantageous as it may require that the excitation beamlet forming element and the emission beamlet forming element be the same. If the disc rotationally oscillates (i.e., does not complete a full revolution), then the emission beamlet forming element may be distinct and different from the excitation beamlet forming element. This may provide the advantage of providing an excitation beamlet forming element that is optimized for the excitation portion of the optical path, while a different emission beamlet forming element may be optimized for the emission portion of the optical path. For example, if the beamlet forming element(s) are lenslet arrays, the size and focal length of the lenslets of the lenslet arrays may be different in the excitation lenslet array as compared to the emission lenslet array.

The imaging system may comprise a multi-lens objective array adjacent to the sample in place of a single objective lens. This imaging system may provide a larger field of view by removing a bulk objective. The system may have lower manufacturing costs and a higher numerical aperture. The new configuration may lead to a larger field of view and lower cost of production. This multi-lens objective may be applied to any of the herein described embodiments/

In some cases, the imaging device (e.g., camera) and the sample are mechanically coupled to a stage. The stage may move the sample and imaging device with respect to the illumination source(s) and the optical masks on the excitation and emission pathways. One or more elements of the imaging system may be stationary, including but not limited to, the illumination source, the optical mask elements (e.g., beamlet forming element and pinhole array), the objective, one or more dichroic mirror one or more turn mirrors, and corresponding tube lenses and relay lenses. The moving elements of the optical system may be limited to the sample, the imaging device and a stage coupled thereto.

The imaging system may be compact. The imaging system may have a benchtop area that measures 8 inches by 20 inches. Without being bound to these dimensions, it is recognized herein that the simplified optical system described herein, as compared to other SIM imaging systems, may allow for smaller imaging housings, benchtop space requirements, improved optical performance and material cost savings. In some cases, the benchtop surface area of the imaging system may be less than or equal to about 5000 cm2, 4500 cm2, 4000 cm2, 3500 cm2, 3000 cm2, 2500 cm2, 2000 cm2, 1500 cm2, 1250 cm2, 1000 cm2, 900 cm2, 850 cm2, 800 cm2, 750 cm2, 700 cm2, 650 cm2, 600 cm2, 500 cm2, 400 cm2, 20 cm2, 100 cm2, 50 cm2 or smaller.

Multiple wavelengths may also be used. When multiple wavelengths of light are used, the wavelengths may be centered at about 400 nm, 450 nm, 500 nm, 550 nm, 600 nm, 650 nm, 700 nm, 750 nm, 800 nm, 850 nm, 900 nm, 950 nm or longer with a bandwidth of about 10 nm, 20 nm, 30 nm, 40 nm, 50 nm, 75 nm, 100 nm, 125 nm, 150 nm, 175 nm, 200 nm, 225 nm, 250 nm, 275 nm, 300 nm or longer. For example, the wavelengths may be centered at about 780 nm with a bandwidth of about 50 nm (e.g., about ((780–(50/2)) =755 nm) to about ((780+(50/2))=805 nm)).

The excitation beam may be directed through an Acousto-Optic Tunable Filter (AOTF). The AOTF may comprise an electro-optical device. The AOTF may function as an electronically tunable excitation filter. The AOTF may modulate the intensity and wavelength of multiple laser beams from the illumination source. In other embodiments, the lasers or LEDs may be turned on and off directly to modulate their use in synchronization with the moving stage. In other embodiments a shutter system may be used.

The excitation beam may be directed through multiple optical elements to improve illumination uniformity. In some embodiments, the excitation beam may pass through a despeckle element, lenses to shape the beam, diffuser elements, liquid light guides, mirror tubes, homogenizing rods, fly eye lenses and other optical elements.

The imaging system may be configured for Quantitative Phase Microscopy (QPM) and/or Fourier Ptychography and/or other phase based imaging. The system may comprise an LED array. The LED array may provide an excitation beam of light onto the sample to then be transmitted through the sample to the collection objective and camera or cameras. In some embodiments, the LED array allows LEDs to be turned on and off in patterns such that the light directed to the sample comes to the sample at various angles of incidence. Multiple images are taken and then digitally reconstructed to recover phase and intensity. The LED array may comprise a LEDs of two or more different wavelengths of light through the sample. The LED light may pass through the sample and be received by the camera. In some embodiments, recovering the absorption information may be a useful assay to determine the quantity or presence of a molecule or protein of interest. In some embodiments, the dichroic mirror used for iSIM may be used without the need to move it out of the optical path or replace it, by choosing the wavelengths of the LEDs in the LED array to coincide with the emission bands of the dichroic.

The imaging system may be configured for hyperspectral imaging (HIS). The hyperspectral illumination beams may be captured by switching a position of a translatable prism to refract the emission beam before passing to the one or more cameras. The imaging system may image in hyperspectral imaging (HIS) and through structured illumination microscopy (SIM). In some cases, the imaging system may create a dispersion pattern where the dispersion element(s) is/are configured to be substantially orthogonal to the oscillation motion of the beamlet forming elements. The dispersion element(s) may be configured to be orthogonal to the rotation angle of the beamlet forming element. The spectra from the each beamlet retains the enhanced resolution from the iSIM method however, the emission light is then spread out across one or more collection units and therefore the characteristics of the emission spectra at each super resolved point may be collected. In some embodiments the spectra may be spread across a plurality of pixels enabling the emission spectra to be binned into 4, 5, 10, 20, 40, 50 or more bins or groups. This hyperspectral imaging may enable discerning multiple different dyes, proteins, or fluorescent molecules that would normally be hidden to be discerned. In this way, more than 2 distinct spectra (for example from two overlapping dyes) may be deconvolved or distinguished.

In some cases, spatial light modulators may be used to create a plurality of beamlets. The excitation beam may be directed through a spatial light modulator. The emission beam may be directed to a second spatial light modulator to form emission beamlets.

As described herein, the previous iSIM imaging systems and corresponding methods were more complex and expensive than the imaging system described herein. The sample and both the excitation and emission beamlet forming elements were fixed in space. To achieve iSIM, previous systems needed to steer the optical beamlets across the sample and then independently or separately across the camera by use of a galvanometer. In contrast, the systems and methods described herein move at least the sample or at least one of the beamlet forming elements. The resulting imaging systems are more compact, more robust, easier to manufacture and assemble and have improved optical performance due to the reduction in the number of optical elements thru which the light must pass thereby. The compact and simplified systems of the present disclosure also require less alignment and may be less subject to heat distortion of the optical path.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least" or "greater than" applies to each one of the numerical values in that series of numerical values.

Whenever the term "no more than," "less than," or "less than or equal to" precedes the first numerical value in a series of two or more numerical values, the term "no more than" or "less than" applies to each one of the numerical values in that series of numerical values.

The term "about" or "nearly" as used herein generally refers to within (plus or minus) 15%, 10%, 9%, 8%, 7%, 6%, 5%, 4%, 3%, 2%, or 1% of a designated value.

As used herein, the singular forms "a", "an", and "the" include plural references unless the context clearly dictates otherwise.

Computer Systems

Figure 24:
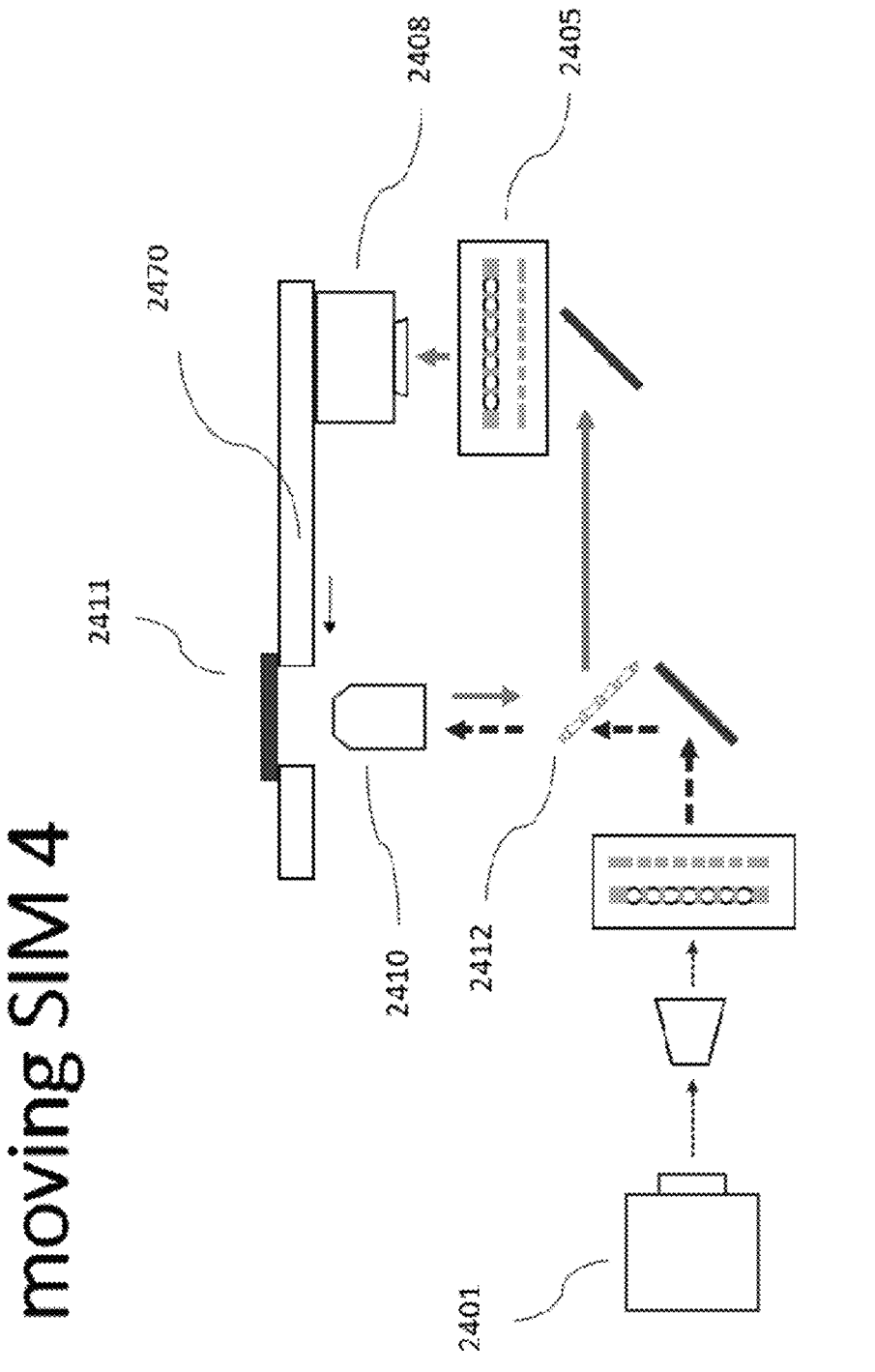
FIG. 24 shows a linear iSIM imaging system, in accordance with some embodiments described herein.
Figure 25:
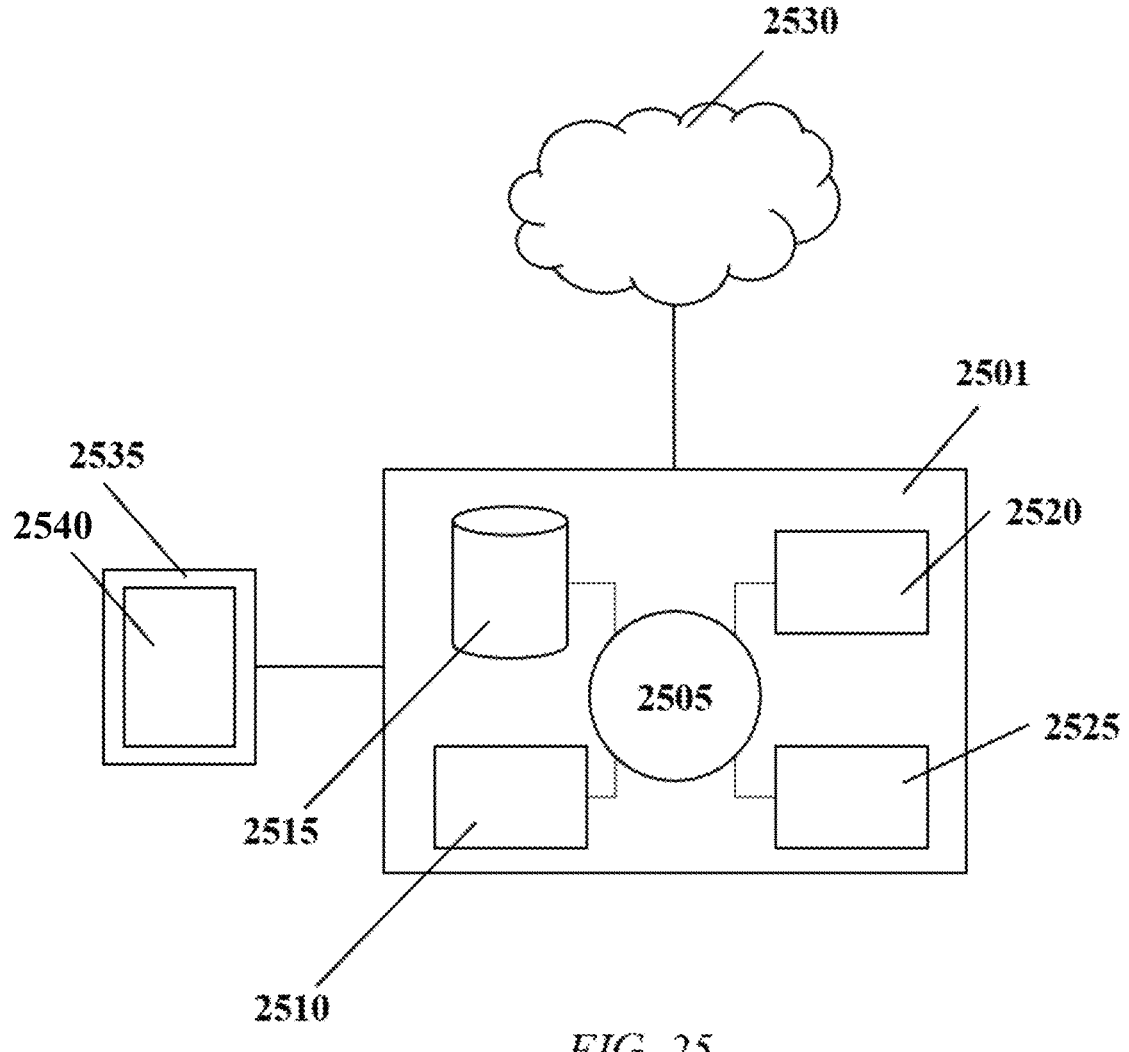
FIG. 25 shows a computer system that is programmed or otherwise configured to implement methods provided herein.

The present disclosure provides computer systems that are programmed to implement methods of the disclosure. FIG. 24 shows a computer system 2401 that is programmed or otherwise configured to control an imaging system described. The computer system 2401 can regulate various aspects of the imaging system of the present disclosure, such as, for example, the illumination source, the mechanical operation of the optical elements, the oscillation units, processing the signals received by the collection unit, and computing a full field of view high-resolution image from structured microscopy signals. The computer system 2401 can be an electronic device of a user or a computer system that is remotely located with respect to the electronic device. The electronic device can be a mobile electronic device.

The computer system 2401 includes a central processing unit (CPU, also "processor" and "computer processor" herein) 2405, which can be a single core or multi core processor, or a plurality of processors for parallel processing. The computer system 2401 also includes memory or memory location 2410 (e.g., random-access memory, read-only memory, flash memory), electronic storage unit 2415 (e.g., hard disk), communication interface 2420 (e.g., network adapter) for communicating with one or more other systems, and peripheral devices 2425, such as cache, other memory, data storage and/or electronic display adapters. The memory 2410, storage unit 2415, interface 2420 and peripheral devices 2425 are in communication with the CPU 2405 through a communication bus (solid lines), such as a motherboard. The storage unit 2415 can be a data storage unit (or data repository) for storing data. The computer system 2401 can be operatively coupled to a computer network ("network") 2430 with the aid of the communication interface 2420. The network 2430 can be the Internet, an internet and/or extranet, or an intranet and/or extranet that is in communication with the Internet. The network 2430 in some cases is a telecommunication and/or data network. The network 2430 can include one or more computer servers, which can enable distributed computing, such as cloud computing. The network 2430, in some cases with the aid of the computer system 2401, can implement a peer-to-peer network, which may enable devices coupled to the computer system 2401 to behave as a client or a server.

The CPU 2405 can execute a sequence of machine-readable instructions, which can be embodied in a program or software. The instructions may be stored in a memory location, such as the memory 2410. The instructions can be directed to the CPU 2405, which can subsequently program or otherwise configure the CPU 2405 to implement methods of the present disclosure. Examples of operations performed by the CPU 2405 can include fetch, decode, execute, and writeback.

The CPU 2405 can be part of a circuit, such as an integrated circuit. One or more other components of the system 2401 can be included in the circuit. In some cases, the circuit is an application specific integrated circuit (ASIC).

The storage unit 2415 can store files, such as drivers, libraries and saved programs. The storage unit 2415 can store user data, e.g., user preferences and user programs. The computer system 2401 in some cases can include one or more additional data storage units that are external to the computer system 2401, such as located on a remote server that is in communication with the computer system 2401 through an intranet or the Internet.

The computer system 2401 can communicate with one or more remote computer systems through the network 2430. For instance, the computer system 2401 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 2401 via the network 2430.

Methods as described herein can be implemented by way of machine (e.g., computer processor) executable code stored on an electronic storage location of the computer system 2401, such as, for example, on the memory 2410 or electronic storage unit 2415. The machine executable or machine readable code can be provided in the form of software. During use, the code can be executed by the processor 2405. In some cases, the code can be retrieved from the storage unit 2415 and stored on the memory 2410 for ready access by the processor 2405. In some situations, the electronic storage unit 2415 can be precluded, and machine-executable instructions are stored on memory 2410.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 2401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2401 can include or be in communication with an electronic display 2435 that comprises a user interface (UI) 2440 for providing, for example, user control of one or more aspects of the imaging system.

Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 2405.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

EXAMPLES

Example 1

FIG. 7 shows an example of a linear motion profile in a sinusoidal pattern. With the sinusoidal pattern shown in FIG. 7, multiple approaches to timing or illumination and imaging are possible.

Method 1—The illumination source is turned on at point 701 and left on through point 704. The image sensor, a camera, acquires images at the same time—from point 701 through point 704. This method may not provide a constant imaging speed across the position of the sample, and therefore the time per pixel is not consistent across the field of view being scanned. This method also requires that the timing of both the camera and the light source be accurately synchronized.

Method 2—the illumination source is turned on at some time before point 702 and turned off at some time after point 703. The collection unit is turned on at point 702 and turned off at point 703. Equivalently, the camera or cameras are set to expose from time point 702 to time point 703. This method may allow a more linear and uniform rate of speed of illumination across the field of view. Another advantage of this method is that it may not be required to precisely synchronize the start of stop of the illumination source and camera. This method may lead to a small amount of photo bleaching in the time the illumination is on but the camera is not capturing any image.

Method 3—the camera is turned on at some time before point 702 and turned off at some point after point 703. Equivalently, the camera or cameras are set to expose from just before time point 702 to just after time point 703. The illumination source is synchronized to start at the time point 702 and turn off at time point 703. This method may allow more linear and uniform rate of speed of illumination across the field of view. This method may also not require precise synchronization between the illumination source and the camera. For example the camera may be turned on a short time before 702 and turned off a short time after 703 when the light source will be dark and the image captured will be the same. This method may be limited by the start-up or cool down time periods of the illumination source and some transient light power could occur during those start-up and cool-down periods.

Method 4—similar to method 2 or 3, but additionally uses a high speed light blocking element to let light through to either the camera or from the illumination source. The high-speed light blocking element may be a shutter or acousto-optical tunable filter (AOTF) or an equivalent device.

Certain modifications of Methods 1-4 are enabled by the imaging systems described herein. For example, if more light is required for longer exposure times, the system can slow down the oscillation frequency. Alternatively, or in addition, the system can expose through more than one half of a period. The system may expose from time point 702 through 703 and then again from 705 to 706 before starting a new exposure. In some cases, the exposure starting at 708 may be a different color from the exposure of 702 through 703.

What is claimed is:

1. A method of imaging a sample comprising:
   a. directing an illumination beam from an illumination source to said sample, wherein said illumination beam passes through a first beamlet forming element;
   b. receiving an optical signal from said sample,
   c. directing at least a portion of said optical signal through a second beamlet forming element to one or more collection units; and
   d. during said imaging, oscillating (i) said first beamlet forming element, and (ii) said second beamlet forming element.

2. The method of claim 1, wherein said first beamlet forming element and said second beamlet forming element oscillate together as a single oscillation unit.

3. The method of claim 1, further comprising, after (d), translocating said first beamlet forming element and said second beamlet forming element out of an optical path and imaging in a second modality.

4. The method of claim 2, wherein said single oscillation unit oscillates with respect to said one or more collection units.

5. The method of claim 1, wherein said optical signal passes through a mask array which is oscillated with said second beamlet forming element.

6. The method of claim 1, wherein said illumination beam passes through a mask array which is oscillated with said first beamlet forming element.

7. The method of claim 1, wherein said first beamlet forming element forms a pattern on said sample which at least one dimension is close to or at a diffraction limit.

8. The method of claim 1, wherein said excitation beam is comprised of more than one wavelength.

9. The method of claim 2, wherein said single oscillation unit oscillates at a frequency from about 1 Hz to about 100 Hz.

10. The method of claim 2, wherein said single oscillation unit oscillates with respect to said illumination source, a collection unit of said one or more collection units, and said sample.

11. The method of claim 2, wherein oscillating said single oscillation unit comprises linear oscillation.

12. The method of claim 11, wherein said linear oscillation is in a sinusoidal pattern.

13. The method of claim 11, wherein said linear oscillation is in a modified triangular pattern.

14. The method of claim 2, wherein said single oscillation unit comprises a counterbalance oscillating opposite to said first beamlet forming element and said second beamlet forming element.

15. The method of claim 1, wherein a light dispersion element is located in an optical path between said emission beamlet forming element and a collection unit of said one or more collection units.

16. An imaging system comprising:

an illumination source configured to provide an illumination beam;

an excitation beamlet forming element configured to direct said illumination beam to a sample;

an emission beamlet forming element configured to focus an optical signal from said sample to one or more collection units; and an oscillation unit configured to oscillate said excitation beamlet forming element and said emission beamlet forming element.

17. The imaging system of claim 16, wherein said oscillation unit is configured for linear motion.

18. The imaging system of claim 16, wherein said oscillation unit is configured for rotational motion.

19. The imaging system of claim 16, wherein said oscillation unit is configured to translate said excitation beamlet forming element and said emission beamlet forming element out of said optical path to allow another imaging modality.

20. The imaging system of claim 16, further comprising a light dispersion element in said optical path between the emission beamlet forming element and a collection unit of said one or more collection units.

* * * * *